United States Patent
Onodera et al.

(10) Patent No.: US 8,291,585 B2
(45) Date of Patent: Oct. 23, 2012

(54) METHOD FOR MANUFACTURING ELECTRONIC COMPONENT

(75) Inventors: Ko Onodera, Tokyo (JP); Satoshi Kurimoto, Tokyo (JP); Hisayuki Abe, Tokyo (JP); Taketo Sasaki, Tokyo (JP); Yoji Tozawa, Tokyo (JP); Osamu Hirose, Tokyo (JP)

(73) Assignee: TDK Corporation, Tokyo (JP)

( * ) Notice: Subject to any disclaimer, the term of this patent is extended or adjusted under 35 U.S.C. 154(b) by 1097 days.

(21) Appl. No.: 12/195,772

(22) Filed: Aug. 21, 2008

(65) Prior Publication Data
US 2009/0053853 A1 Feb. 26, 2009

(30) Foreign Application Priority Data

Aug. 22, 2007 (JP) ................ P2007-216349
Aug. 22, 2007 (JP) ................ P2007-216350

(51) Int. Cl.
*H01R 9/00* (2006.01)
*H05K 3/00* (2006.01)

(52) U.S. Cl. ........... 29/843; 29/25.03; 29/830; 257/692; 361/306.3; 361/309

(58) Field of Classification Search ............... 29/25.01, 29/25.03, 25.42, 830, 842, 843; 257/692, 257/778, 779; 361/306.1, 306.3, 309, 310, 361/321.2
See application file for complete search history.

(56) References Cited

U.S. PATENT DOCUMENTS 6,046,902 A * 4/2000 Nakagawa et al. ........ 361/306.1
6,191,933 B1 * 2/2001 Ishigaki et al. ............. 361/309

FOREIGN PATENT DOCUMENTS

| JP | A-04-022509 | 1/1992 |
| JP | A-05-167224 | 7/1993 |
| JP | A-05-167225 | 7/1993 |
| JP | A-6-224073 | 8/1994 |
| JP | A-07-201654 | 8/1995 |
| JP | A-7-297075 | 11/1995 |
| JP | A-09-246125 | 9/1997 |
| JP | A-2000-306764 | 11/2000 |
| JP | A-2004-146401 | 5/2004 |

OTHER PUBLICATIONS

Notice of Reasons for Rejection for Japanese Patent Application No. P2007-216349. Sep. 8, 2009.
Notice of Reasons for Rejection, Japanese Patent Application No. 2007-216350, Jul. 13, 2009.
Office Action issued in Chinese Patent Application No. CN 200810214008.2 dated Dec. 16, 2010 (with translation).

* cited by examiner

*Primary Examiner* — Donghai D. Nguyen
(74) *Attorney, Agent, or Firm* — Oliff & Berridge, PLC

(57) ABSTRACT

A chip element in the form of a substantially rectangular parallelepiped having end surfaces and side surfaces is formed (step of forming chip element). An electrically conductive green sheet is formed (step of forming electrically conductive green sheet). An electrically conductive paste is applied to the end surfaces of the chip element (step of application electrically conductive paste). A chip element is formed in which the electrically conductive green sheet is attached to the end surface via the electrically conductive paste applied to the end surface of the chip element (step of attaching electrically conductive sheet). In the step of attaching, the end surface of the electrically conductive green sheet on the side of the side surfaces is positioned on the outside of the side surfaces, and the electrically conductive paste applied to the end surface is pressed out into a space between the electrically conductive green sheet and ridge portions.

14 Claims, 19 Drawing Sheets

METHOD FOR MANUFACTURING ELECTRONIC COMPONENT

BACKGROUND OF THE INVENTION

1. Field of the Invention

The present invention relates to a method for manufacturing a chip-like electronic component.

2. Related Background Art

There are chip-like electronic components including a chip element in the form of a substantially rectangular parallelepiped having inner electrodes and external electrodes formed on both end surfaces of the chip element. A method for forming the external electrodes of such an electronic component is described in Japanese Patent Application Laid-open No. H4-22509. With this method, an electrically conductive paste is coated on the end surfaces of the chip element by dipping the end surfaces of the chip element and ridge portions surrounding the end surfaces into the electrically conductive paste. The external electrodes are then formed by drying and sintering.

SUMMARY OF INVENTION

With the method described in Japanese Patent Application Laid-open No. H4-22509, the end surface of the chip element is oriented downward, dipped into the electrically conductive paste, and raised. As a result, the electrically conductive paste is gathered below the end surface of the chip element under the effect of surface tension and gravity. Therefore, the thickness of the electrically conductive paste on the ridge portions surrounding the end surface the chip element becomes less than that on the end surface and the end surface assumes a convex curved shape.

Where the thickness of the electrically conductive paste on the ridge portions of the chip element deceases, the reliability of the electronic component decreases. For example, adhesive strength between the external electrodes and chip element decreases and solder leach can occur. Further, where drying and sintering are performed in a state in which the thickness of the electrically conductive paste on the ridge portions is small and then a plating treatment is performed, the plating liquid can penetrate from the ridge portions of the chip element into the chip element. Where the plating liquid penetrates into the chip element, characteristics of the electronic component can be degraded and short circuiting sometimes occur.

Further, where the thickness of the electrically conductive page on the ridge portions of the chip element is small and the end surface assumes a convex curved shape, the R (curvature radius) of the corner portions of the external electrodes increases. As a result when surface mounting is performed by reflowing, a tombstone phenomenon (Manhattan phenomenon) in which the electronic component rises on a substrate can occur.

Accordingly it is an object of the present invention to provide a method for manufacturing an electronic component that can inhibit the decrease in reliability and the occurrence of mounting defects.

A method for manufacturing an electronic component in accordance with the present invention is a method for manufacturing an electronic component provided with a chip element and external electrodes formed on the chip element this method including a preparation step of preparing the chip element having a flat surface, a second surface perpendicular to the first surface, and a ridge portion between the first surface and the second surface; an application step of applying an electrically conductive paste and a sheet including an electrically conductive material to the chip element; a drying step of drying the electrically conductive paste and the sheet to form a layer including the electrically conductive material, and a formation step of sintering the layer and forming the external electrodes, wherein in the application step, the electrically conductive paste and the sheet are applied to the chip element so that the sheet overlaps at least portion of the ridge portion as viewed from a direction perpendicular to the sheet and is positioned opposite the first surface and the ridge portion at a distance from at least the ridge portion, and that the electrically conductive paste is present at least in a space sandwiched by the sheet and the ridge portion so as to cover the ridge portion.

In the method for manufacturing an electronic component in accordance with the present invention, in the application step, the electrically conductive paste and the sheet are applied to the chip element so that the sheet overlaps at least portion of the ridge portion as viewed from the direction perpendicular to the sheet and is positioned opposite the first surface and the ridge portion at a distance from at least the ridge portion, and the electrically conductive paste is present at least in a space sandwiched by the sheet and the ridge portion so as to cover the ridge portion. The electrically conductive paste and sheet are then dried and sintered to form external electrodes. Therefore, in the external electrodes the thickness of the corner portions covering the ridge portion of the chip element is larger than that of the plane portion covering the first surface of the chip element. Therefore, the decrease in reliability can be inhibited. Furthermore, because the sheet is attached to the first surface, the external electrode formed on the surface has a plane portion parallel to the first surface. As a result, the surface of the external electrode on the first electrode side becomes flat and the thickness of the corner portions increases. Therefore, the R on the outer side in the corner portions of the eternal electrode decreases and the occurrence of a tombstone phenomenon during mounting can be inhibited. As a consequence, mounting defects can be inhibited.

In the method for manufacturing an electronic component in accordance with the present invention, it is preferred that the application step include: a first application step of applying the electrically conductive paste to the first surface of the chip element; and a second application step of pressing out the electrically conductive paste attached to the first surface into the space sandwiched by the sheet and the ridge portion by attaching the sheet to the first surface via the electrically conductive paste. In this case, the thickness of tie corner portions covering the ridge portion of the chip element is larger than that of the plane portion covering the first surface of the chip element, and external electrodes with a flat plane portion can be easily formed.

In the method for manufacturing an electronic component in accordance with the present invention, it is preferred that in the second application step, the sheet be moved reciprocatingly with respect to the first surface in a direction parallel to the first surface in a state in which the sheet is attached to the first surface via the electrically conductive paste. In this case, the electrically conductive paste applied to the first surface can be easily pressed out into the space between the sheet and the ridge portion of the chip element. Further, an air drain is formed between the first surface of the chip element, electrically conductive paste, and sheet, and the sheet can be strongly adhered to the chip element via electrically conductive paste by the surface tension of the electrically conductive paste on the end surface of the chip element and the sheet.

In the method for manufacturing an electronic component in accordance with the present invention, it is preferred that in the preparation step, the chip element having the first surface of a substantially rectangular shape be prepared; and in the second application step, the sheet be moved reciprocatingly with respect to the first surface in a direction parallel to the first surface and along a diagonal direction of the first surface in a state in which the sheet is attached to the first surface via the electrically conductive paste. In this case, the electrically conductive paste applied to the first surface can be pressed out even easier toward the four corners of the first surface in the space between the sheet and the ridge portion of the chip element.

In the method for manufacturing an electronic component in accordance with the present invention, it is preferred that in the preparation step, the chip element in the form of a substantially rectangular parallelepiped be prepared that has four second surfaces perpendicular to the first surface and four ridge portions between the first surface and the four second surfaces; and in the application step, the electrically conductive paste and the sheet be attached so that the electrically conductive paste is present at least in a space sandwiched by the sheet and the four ridge portions of the chip element. In this case, the thickness of the external electrodes at the four ridge portions surrounding the first surface of the chip element is larger than that of the external electrodes on the first surface. As a result, the decrease in reliability can be inhibited more effectively. Furthermore, because the thickness of the external electrodes at the four ridge portions increases, the R of the four corner portions of the external electrodes decreases. Therefore, mounting defects can be inhibited more reliably.

In the method for manufacturing an electronic component in accordance with the present invention, it is preferred that the sheet be an electrically conductive green sheet including an electrically conductive powder and a solvent. In this case, because the sheet is dried earlier than the electrically conductive paste, the solvent diffuses from the electrically conductive paste into the sheet and, therefore, the electrically conductive paste and the sheet are integrated and dried. The integrated electrically conductive paste and sheet are then sintered. As a result the occurrence of cracks between a portion constituted by the electrically conductive paste and a portion constituted by the sheet in the external electrode can be inhibited.

In the method for manufacturing an electronic component in accordance with the present invention, it is preferred that the electrically conductive paste include a glass component, and the sheet include no glass component. In such case, for example, when the chip element includes a glass component, the electrically conductive paste can be strongly bonded to the chip element because the electrically conductive paste includes a glass component. Furthermore, because the sheet attached to the outer side of the electrically conductive paste includes no glass component, when sintering is performed, the adhesion of the end surface of the external electrode to the peripheral components can be inhibited. Furthermore, because the sheet includes no glass component, the content ratio of the electrically conductive material can be increased accordingly and electric conductivity of the external electrodes can be increased. Furthermore, when plating is performed on the external electrodes, because the sheet includes no glass component, adhesion between the plated film and the sheet can be increased and peeling between the layers and the plated layer can be inhibited.

In the method for manufacturing an electronic component in accordance with the present invention, it is preferred that in the formation step, barrel polishing be performed after the layer has been sintered. As a result when portions formed by the sheet protrude after the layers that will serve as external electrodes have been sintered, shaping can be easily performed. As a result, mounting defects caused by shape defects of the external electrodes can be inhibited.

A method for manufacturing an electronic component in accordance with the present invention is a method for manufacturing an electronic component provided with a chip element and external electrodes formed on the chip element, this method including a preparation step of preparing the chip element having a flat surface, a second surface perpendicular to the first surface, and a ridge portion between the first surface and the second surface; an application step of applying an electrically conductive paste and a sheet including an electrically conductive material to the chip element; a drying step of drying the electrically conductive paste and the sheet to form a layer including the electrically conductive material; and a formation step of sintering the layer and forming the external electrodes, wherein in the application step, the electrically conductive paste and the sheet are applied to the chip element so that an end surface of the sheet overlaps the ridge portion along a longitudinal direction of the ridge portion, as viewed from a direction perpendicular to the sheet, and that the electrically conductive past is present over a region from the ridge portion to the end surface so as to cover the ridge portion.

In the method for manufacturing an electronic component in accordance with the present invention, in the application step, the electrically conductive paste and the sheet are applied to the chip element so that an end surface of the sheet overlaps the ridge portion along a longitudinal direction of the ridge portion, as viewed from the direction perpendicular to the sheet, and the electrically conductive paste is present over a region from the ridge portion to the end surface so as to cover the ridge portion. The electrically conductive paste and sheet are then dried and sintered to form external electrodes. Therefore, in the external electrodes the thickness of the corner portions covering the ridge portion of the chip element is larger than that of the plane portion covering the first surface of the chip element. Therefore, the decrease in reliability can be inhibited. Furthermore, because the sheet is attached to the first surface, the external electrode formed on the first surface has a plane portion parallel to the first surface. As a result, the surface of the external electrode on the first electrode side becomes flat and the thickness of the corner portions increases. Therefore, the R on the outer side in the corner portions of the external electrode decreases and the occurrence of a tombstone phenomenon during mounting can be inhibited. As a consequence, mounting defects can be inhibited.

In the method for manufacturing an electronic component in accordance with the present invention, it is preferred that the application step include: a first application step of applying the electrically conductive paste to the first surface of the chip element; and a second application step of pressing out the electrically conductive paste applied to the first surface into a region from the ridge portion to the end surface by attaching the sheet to the first surface via the electrically conductive paste. In this case, the thickness of the corner portions covering tie ridge portion of the chip element is larger than that of the plane portion covering the first surface of the chip element and external electrodes with a flat plane portion can be easily formed.

In the method for manufacturing an electronic component in accordance with the present invention, it is preferred that in the second application step, the sheet be moved reciprocatingly with respect to the first surface in a direction parallel to the first surface in a state in which the sheet is attached to the first surface via the electrically conductive paste. In this case, the electrically conductive paste applied to the first surface can be easily pressed out into tie region from the ridge portion to the end surface. Further, an air drain is formed between the first surface of the chip element, electrically conductive paste, and the sheet and the sheet can be strongly adhered to the chip element via the electrically conductive paste by the surface tension of the electrically conductive paste on the end surface of the chip element and the sheet.

In the method for manufacturing an electronic component in accordance with the present invention, it is preferred that in the preparation step, the chip element having the first surface of a substantially rectangular shape be prepared; and in the second application step, the sheet be moved reciprocatingly with respect to the first surface in a direction parallel to the first surface and along a diagonal direction of the first surface in a state in which the sheet is attached to the first surface via the electrically conductive paste. In this case, the electrically conductive paste applied to the first surface can be pressed out even easier toward the four corners of the first surface in the region between the sheet and the ridge portion of the chip element.

In the method for manufacturing an electronic component in accordance with the present invention, it is preferred that in the preparation step, the chip element in the form of a substantially rectangular parallelepiped be prepared that has four second surfaces perpendicular to the first surface and four ridge portions between the first surface and the four second surfaces; and in the application step, the electrically conductive paste and the sheet be applied to the chip element so that the four end surfaces of the sheet of a substantially rectangular shape overlap the respective ridge portions along a longitudinal direction of the ridge portions, as viewed from the direction perpendicular to the sheet and that the electrically conductive paste is present over a region from the ridge portions to the end surfaces so as to cover the ridge portions. In this case, the thickness of the external electrodes at the four ridge portions surrounding the first surface of the chip element is larger than that of the external electrodes on the first surface. As a result, the decrease in reliability can be inhibited more effectively. Furthermore, because the thickness of the external electrodes at the four ridge portions increases, the R of the four corner portions of the external electrodes decreases. Therefore, mounting defects can be inhibited more reliably.

In the method for manufacturing an electronic component in accordance with the present invention, it is preferred that the sheet be an electrically conductive green sheet including an electrically conductive powder and a solvent. In this case, because the sheet is dried earlier than the electrically conductive paste, the solvent diffuses from the electrically conductive paste into tie sheet and, therefore, the electrically conductive paste and the sheet are integrated and dried. The integrated electrically conductive paste and sheet are then sintered. As a result, the occurrence of cracks between a portion constituted by the electrically conductive paste and a portion constituted by the sheet in the external electrode can be inhibited.

In the method for manufacturing an electronic component in accordance with the present invention, it is preferred that the electrically conductive paste include a glass component, and the sheet include no glass component. In such case, for example, when the chip element includes a glass component, the electrically conductive paste can be strongly bonded to the chip element because the electrically conductive paste includes a glass component. Furthermore, because the sheet attached to the outer side of the electrically conductive paste includes no glass component, when sintering is performed, the adhesion of the end surface of the external electrode to the peripheral components can be inhibited. Furthermore, because the sheet includes no glass component, the content ratio of the electrically conductive material can be increased accordingly and electric conductivity of the external electrodes can be increased. Furthermore, when plating is performed on the external electrodes, because the sheet includes no glass component adhesion between the plated film and the sheet can be increased and peeling.

In the method for manufacturing an electronic component in accordance with the present invention, it is preferred that in the formation step, barrel polishing be performed after the layer has been sintered. As a result, when portions formed by the sheet protrude after the layers that will serve as external electrodes have been sintered, shaping can be easily performed. As a result, mounting defects caused by shape defects of the external electrodes can be inhibited.

With the method for manufacturing an electronic component in accordance with the present invention, it is possible to provide a method for manufacturing an electronic component that can it the decrease in reliability and the occurrence of mounting defects.

DESCRIPTION OF THE PREFERRED EMBODIMENTS

The best mode for carrying out the present invention will be described below in greater detail with reference to the appended drawings. In the explanation of the drawings, identical elements will be assigned with identical reference symbols and redundant explanation thereof will be omitted.

Embodiment 1

Figure 1:
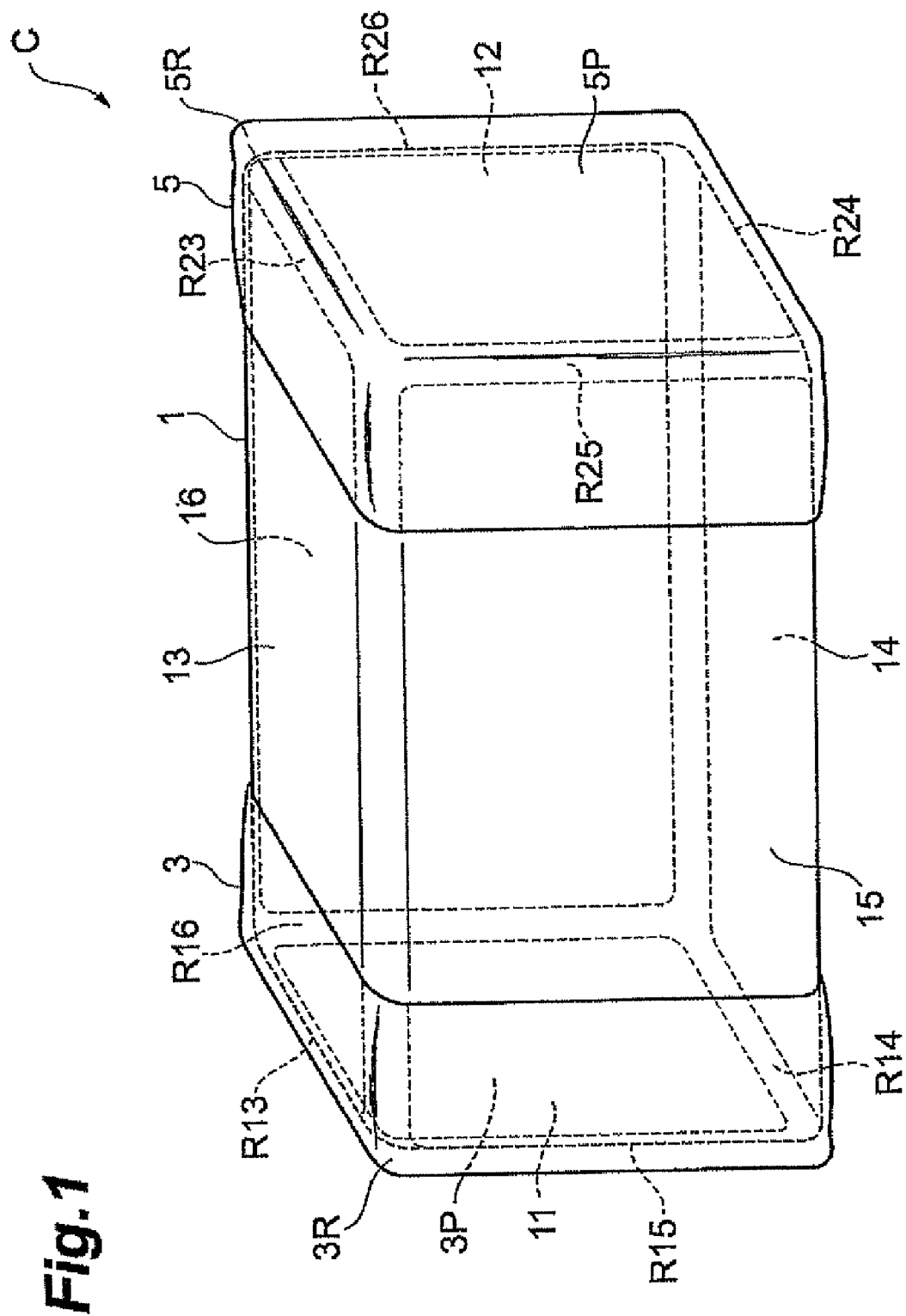
FIG. 1 is a perspective view of an electronic component of Embodiment 1.
Figure 2:
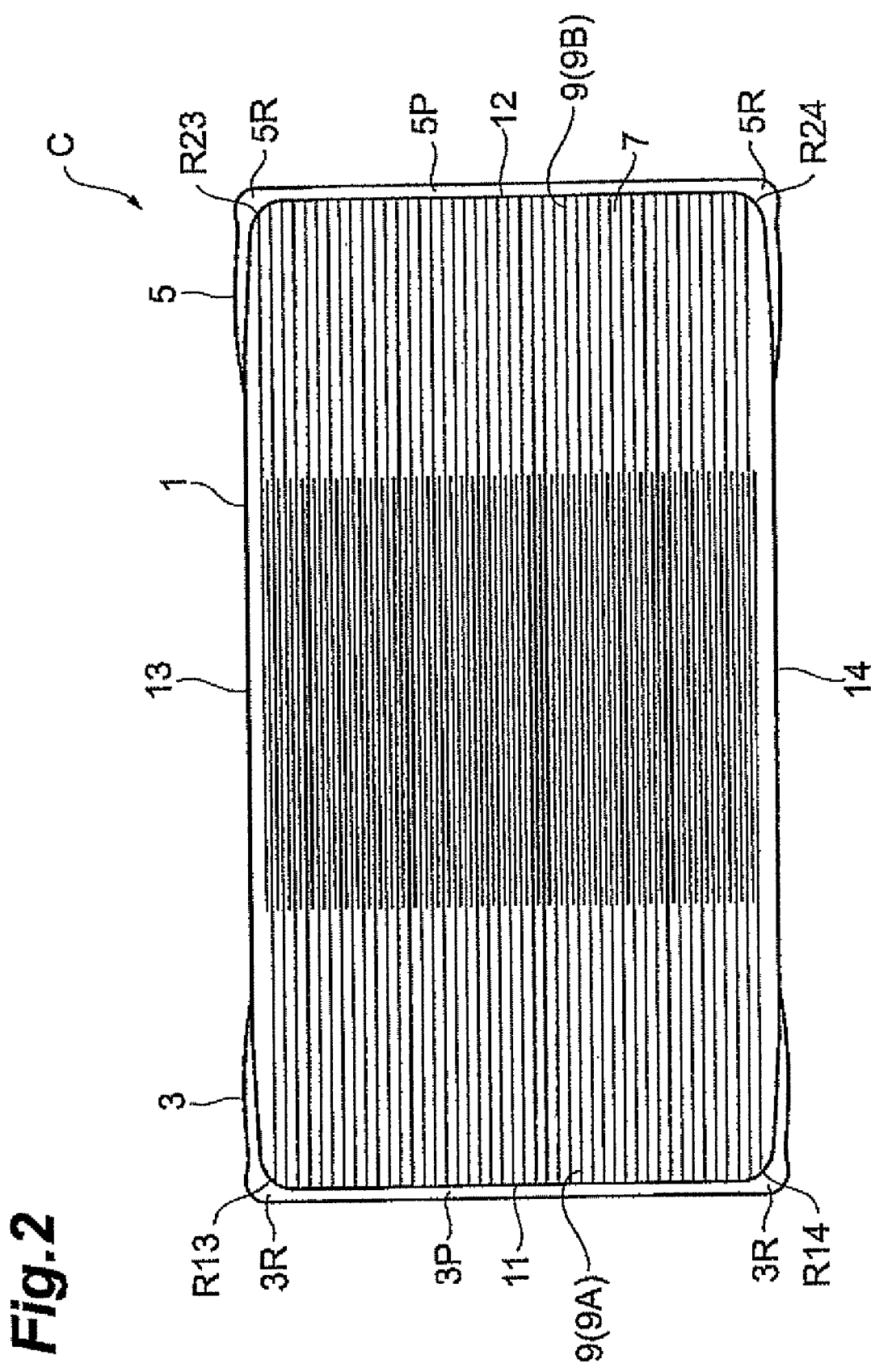
FIG. 2 is a cross-sectional view of the electronic component of Embodiment 1.

First an electronic component C of the present embodiment will be explained with reference to FIG. 1 and FIG. 2. FIG. 1 is a perspective view of the electronic component of the present embodiment FIG. 2 is a cross-sectional view of the electronic component of the present embodiment. The electronic component C of the present embodiment is a chip-like multilayer ceramic capacitor. The electronic component C is in the form of a substantially rectangular parallelepiped and, for example, has a length in the longitudinal (transverse) direction of about 1.0 mm and a length in the width direction and a length in the depth direction of about 0.5 mm.

The electronic component C includes a chip element 1 in the form of a substantially rectangular parallelepiped, and a first external electrode 3 and a second external electrode 5 formed on respective end portions of the chip element 1. The chip element 1 has mutually opposing end surface 11 and end surface 12, mutually opposing side surface 13 and side surface 14 that are perpendicular to the end surfaces 11, 12, and mutually opposing side surface 15 and side surface 16 that are perpendicular to the end surfaces 11, 12 and side surfaces 13, 14.

Further, the chip element 1 has a ridge portion R13 between the end surface 11 and side surface 13, a ridge portion R14 between the end surface 11 and side surface 14, a ridge portion R15 between the end surface 11 and side surface 15, a ridge portion R16 between the end surface 11 and side surface 16, a ridge portion R23 between the end surface 12 and side surface 13, a ridge portion R24 between the end surface 12 and side surface 14, a ridge portion R25 between the end surface 12 and side surface 15, and a ridge portion R26 between the end surface 12 and side surface 16. The ridge portions R13 to R16, R23 to R26 are rounded by polishing the chip element 1. The rounding by polishing is performed to prevent the ridge portions R13 to R16, R23 to R26 of the chip element 1 from damage. The curvature radius of ridge portions R13 to R16, R23 to R26 in the chip element 1 is, for example, about 5% to 10% the length of the electronic component C in the width direction.

The first external electrode 3 covers the end surface 11, the ridge portion R13 between the end surface 11 and side surface 13, the ridge portion R14 between the end surface 11 and side surface 14, the ridge portion R15 between the end surface 11 and side surface 15, and the ridge portion R16 between the end surface 11 and side surface 16 in the chip element 1. The first external electrode 3 also covers portions of the side surfaces 13 to 16 on the side of the end surface 11. Such a first external electrode 3 includes a flat plane portion 3P that covers the end surface 11 and a corner portion 3R that is positioned on the circumference of the plane portion 3P and covers the ridge portions R13 to R16 of the chip element 1. In the first external electrode 3, the thickness of the corner portion 3R is larger than that of the plane portion 3P. Further, a concave neck can be also formed between the corner portion 3R and the portion covering the side surfaces 13 to 16 in the first external electrode 3.

The second external electrode 5 covers an end surface 12 in the chip element 1, the ridge portion R23 between the end surface 12 and side surface 13, the ridge portion R24 between the end surface 12 and side surface 14, the ridge portion R25 between the end surface 12 and side surface 15, and the ridge portion R26 between the end surface 12 and side surface 16. The second external electrode 5 also covers portions of the side surfaces 13 to 16 on the side of the end surface 12 Such a second external electrode 5 includes a flat plane portion 5P that covers the end surface 12 and an corner portion 5R that is positioned on the circumference of the plane portion 5P and covers the ridge portions R23 to R26 of the chip element 1. In the second external electrode 5, the thickness of the corner portion 5R is larger than that of the plane portion 5P. Further, a concave neck can be also formed between the corner portion 5R and the portion covering the side surfaces 13 to 16 in the second external electrode 5.

As shown in FIG. 2, the chip element 1 is configured by alternately laminating a plurality of dielectric layers 7 and a plurality of internal electrode layers 9. The lamination direction is perpendicular to the direction in which the end surfaces 11, 12 formed on a pair of the first external electrode 3 and second external electrode 5 face each other and parallel to the direction in which the side surface 13 and side surface 14 face each other. In FIG. 2, the number of the dielectric layers 7 and internal electrode layers 9 is such that the layers can be visually recognized in the drawing, but actually from several tens to about five hundreds dielectric layers 7 and internal electrode layers 9 are laminated to obtain the necessary electric characteristics. Further, actual dielectric layers 7 are integrated to a degree such that boundaries therebetween cannot be visually recognized. The dielectric layers 7 are composed of a dielectric material, for example, of a $BaTiO_3$ system, $Ba(Ti, Zr)O_3$ system, or $(Ba, Ca)TiO_3$ system.

The internal electrode layers 9 are laminated to reach the ridge portions R13 to R16, R23 to R26 of the chip element 1 in order to reduce the size and increase the capacity thereof. The internal electrode layers 9 are composed of an electrically conductive material such as a basic metal, for example Ni.

The internal electrode layers 9 include first internal electrode layers 9A and a second internal electrode layers 9B. The first internal electrode layers 9A are shifted toward the first external electrode 3 with respect to the second internal electrode layers 9B, and the end surfaces of the first internal electrode layers are exposed from the end surface 11 and ridge portions R13, R14 of the chip element 1. As a result, the first internal electrode layers 9A are mechanically and electrically connected to the fit external electrode 3. The second internal electrode layers 9B are shifted toward the second external electrode 5 with respect to the first internal electrode layers 9A, and the end surfaces of the second internal electrode layers are exposed from the end surface 12 and ridge portions R23, R24 of the chip element 1. As a result, the second internal electrode layers 9B are mechanically and electrically connected to the second external electrode 5.

The first and second external electrodes 3, 5 of the above described electronic component C, the thickness of the corner portions 3R, 5R is larger than that of the plane portions 3P, 5P. Therefore, the adhesive strength between the first and second external electrodes 3, 5 and the chip element 1 is increased and the occurrence of solder leach can be inhibited. The thickness of the plane portions 3P, 5P and corner portions 3R, 5R in the first and second external electrodes 3, 5 is the thickness in the direction normal to the surface of the chip element 1 with which the respective portions come into contact.

In the first and second external electrodes 3, 5 of the electronic component C, the thickness of the corner portions 3R, 5R are larger than the thickness of the plane portions 3P, 5P, and the plane portions 3P, 5P are flat. Therefore, the R (curvature radius) of the corner portions 3R, 5R is small. As a result, the occurrence of a tombstone phenomenon in which the electronic component rises when reflow soldering is performed can be prevented.

Figure 3:
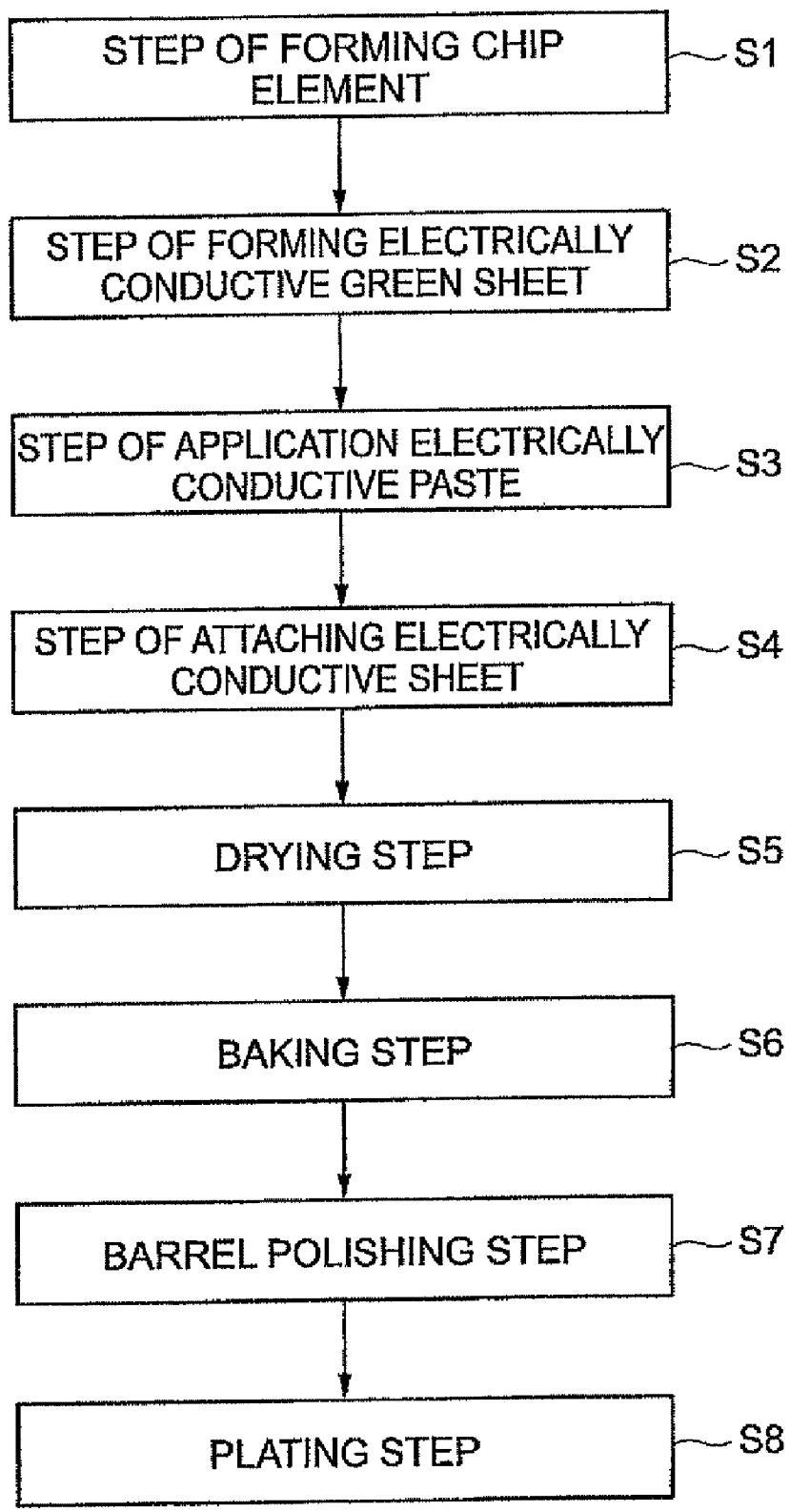
FIG. 3 is a flowchart illustrating a method for manufacturing the electronic component of Embodiment 1.

A method for manufacturing the electronic component of the present embodiment will be described below. As shown in FIG. 3, the method for manufacturing the electronic component of the present embodiment includes a step of forming chip element (preparation step) S1, a step of forming electrically conductive green sheet S2, a step of application electrically conductive paste (first attachment step) S3, a step of attaching electrically conductive sheet (second attachment step) S4, a drying step S5, a sintering step S6, a barrel polishing step S7, and a plating step S8. Each of the steps will be described below in greater detail.

First, in the step of forming chip element S1, the chip element 1 is formed. In order to form the chip element 1, first ceramic green sheets that will serve as the dielectric layers 7 are formed. The ceramic green sheets are formed by coating ceramic slurry on a PET (polyethylene terephthalate) films by using a doctor blade method or the lie, and then drying. The ceramic slurry is obtained, for example by adding a solvent, a plasticizer, a glass fit, and the like to a dielectric material containing barium titanate as the main component, mixing, and dispersing. An electrode pattern that will serve as the internal electrode layers 9 is screen printed on the formed ceramic green sheet and dried An electrode paste for printing the electrode pattern is obtained by mixing a binder or a solvent with a Ni powder.

A plurality of green sheets provided with electrode patterns are thus formed and laminated. The laminate of the green sheets provided with the electrode patterns is cut and a laminated chip in the form of a rectangular parallelepiped is formed. The laminated chip is sintered. The sintered laminated chip is barrel polished to form ridge portions on the rectangular parallelepiped. The aforementioned chip element 1 is manufactured in the above-described manner.

Figure 4A:
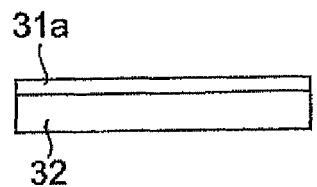
FIG. 4 illustrates a method for forming an electrically conductive green sheet of Embodiment 1.
Figure 4B:
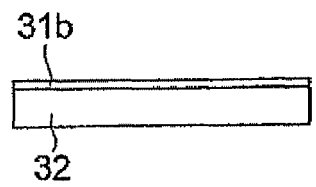

On the other hand, in the step of forming electrically conductive green sheet S2, the electrically conductive green sheet is formed by the procedure illustrated by FIG. 4. FIG. 4 shows a method for forming the electrically conductive green sheet of the present embodiment. First, as shown in FIG. 4A, a paste for the electrically conductive green sheet is coated on a PET (polyethylene terephthalate) film 32 to a thickness of about 100 μm. The paste for the electrically conductive green sheet is obtained by mixing a conductive powder of silver, palladium, silver-palladium, or copper with a resinous binder and an organic solvent.

Figure 4C:
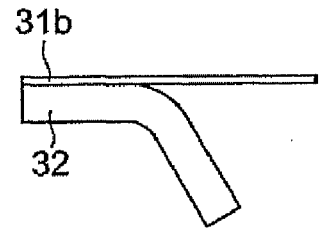

The paste 31a coated on the PET film 32 is damp-dried by far-infrared radiation or the like to form electrically conductive green sheet perform 31b (FIG. 41). After damp-drying, the electrically conductive green sheet preform 31b is not fully dried and the organic solvent remains therein. The thickness of the electrically conductive green sheet preform 31b is about 30 μm to 60 μm. Then, as shown in FIG. 4C, the PET film 32 is peeled off from the electrically conductive green sheet preform 31b.

The electrically conductive green sheet preform 31b is then cut to the same shape as the end surfaces 11, 12 of the chip element 1 to form electrically conductive green sheets 31. The end surface 11 and end surface 12 of the chip element 1 of the present embodiment have the same square shape, and the electrically conductive green sheet 31 also has the same square shape. The size of the electrically conductive green sheet 31 is preferably such that one side thereof is equal to or larger an the width of the chip element 1, and it is preferred that one side be about 100% to 110% the width of the chip element 1. The width of the chip element 1, as refeed to herein is the distance between the mutually opposing side surface 13 and side surface 14, or the distance between the mutually opposing side surface 15 and side surface 16. The electrically conductive green sheet 31 is in a state in which it includes the electrically conductive powder and the binder.

Then, in the step of application electrically conductive paste 83, the electrically conductive paste is applied on the chip element 1. The electrically conductive paste is obtained by adding glass frit to the components of the paste for the electrically conductive green sheet The end surface 11 of the chip element 1 is oriented downward and the end surface 11, ridge portions R13 to R16, and portions of the side surfaces 13 to 16 on the side of the end surface 11 are dipped into the electrically conductive paste. The electrically conductive paste is thus coated on the end surface 11, ridge portions R13 to R16, and portions of the side surfaces 13 to 16 on the side of the end surface 11 of the chip element 1.

Figure 5:
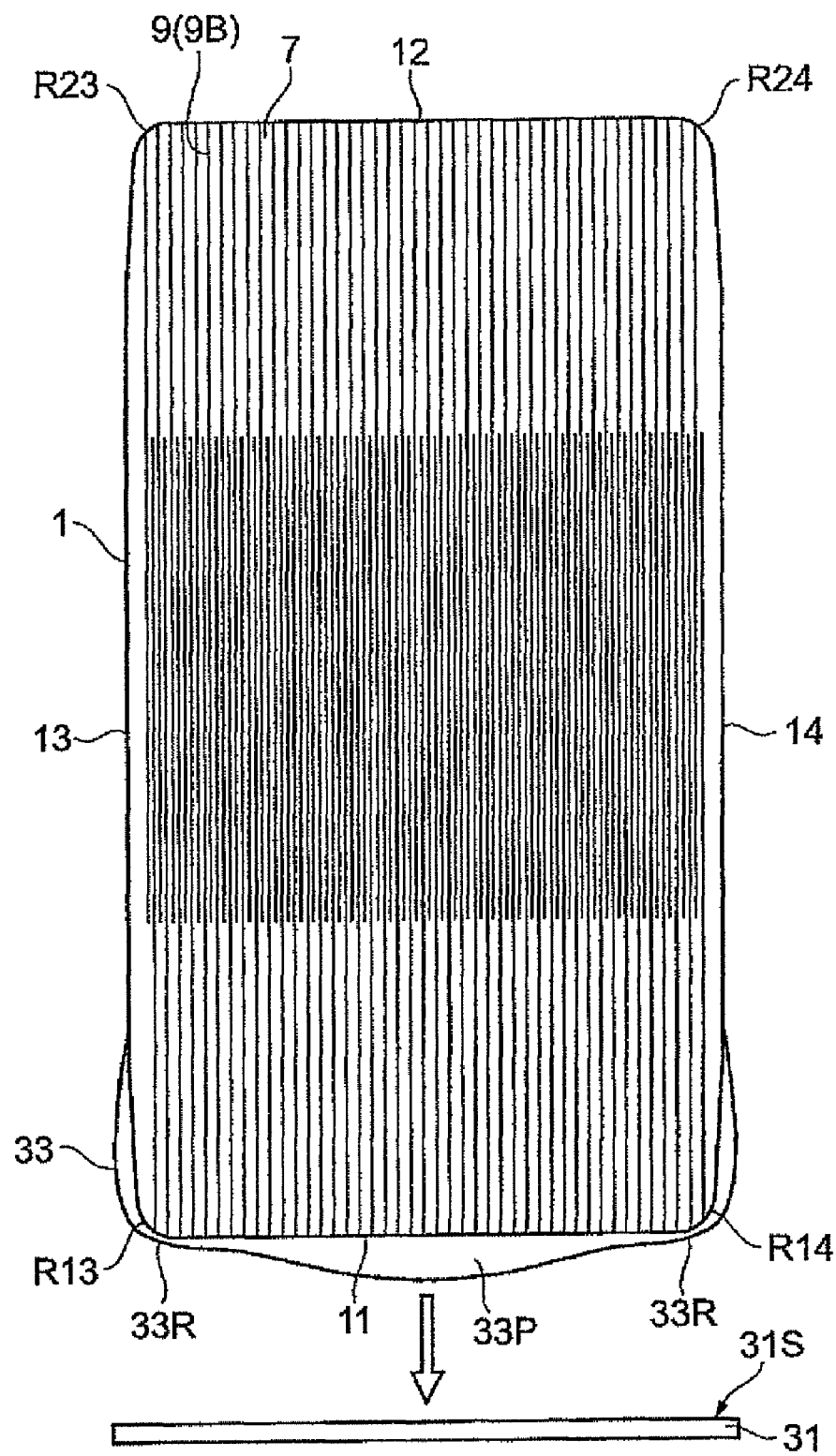
FIG. 5 is a cross-sectional view illustrating step of application electrically conductive paste and step of attaching electrically conductive sheet of Embodiment 1.

The state after applying the electrically conductive paste 33 is shown FIG. 5. FIG. 5 is a cross-section view illustrating the step of application electrically conductive paste S3 and the step of attaching electrically conductive sheet S4 in the present embodiment. As shown in FIG. 5, the electrically conductive paste 33 is coated on the end surface 11, ridge portions R13 to R16, and portions of the side surfaces 13 to 16 on the side of the end surface 11 of the chip element 1. In a state in which the end surface 11 faces down, the electrically conductive past 33 gathers below the end surface 11 of the chip element 1 under the effect of surface tension and gravity. As a result, the thickness of the electrically conductive paste in a paste portion 33R coated on the ridge portions R13 to R16 of the chip element 1 in the electrically conductive paste 33 is less than that of a portion 33P coated on the end surface 11. Further, the portion 33P of the coated electrically conductive paste 33 has a convex curved surface.

Figure 6:
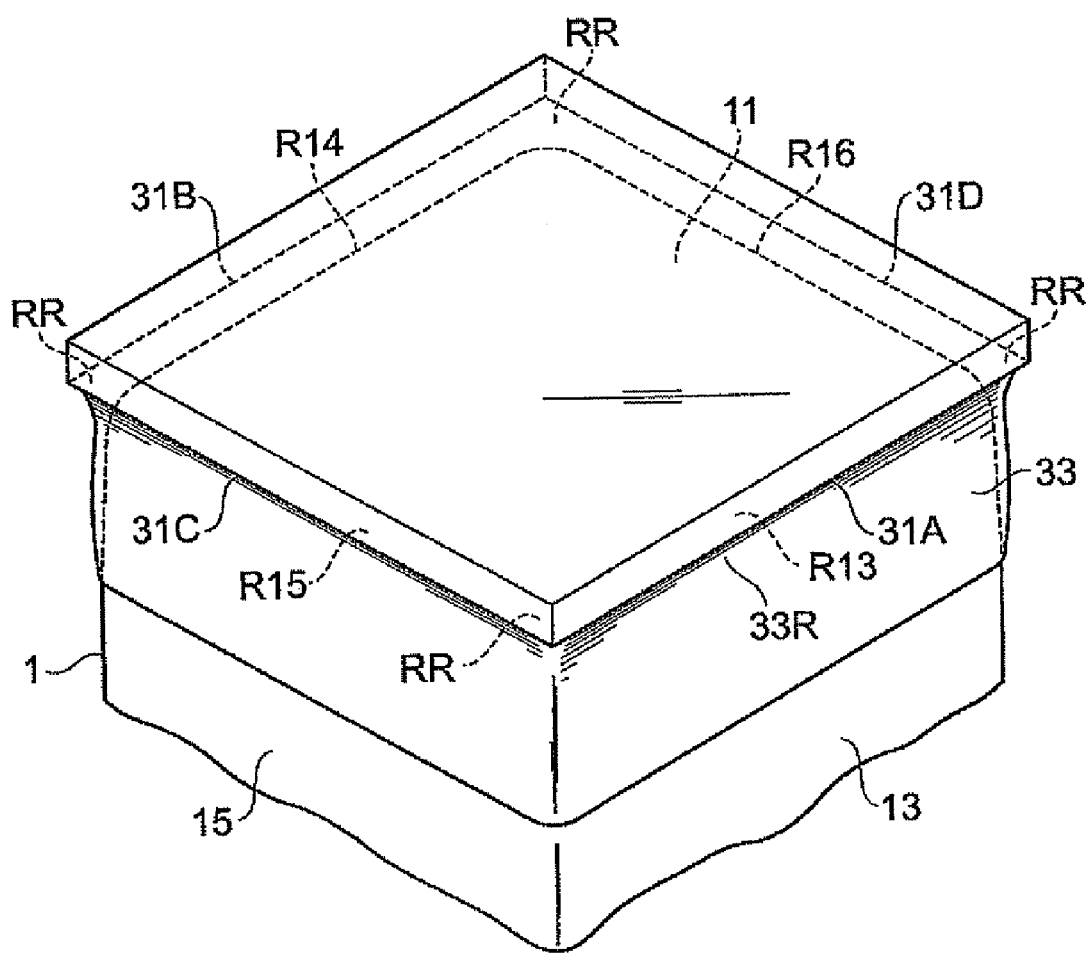
FIG. 6 is a perspective view illustrating a state in which the electrically conductive green sheet is attached to an end surface of the chip element.
Figure 7:
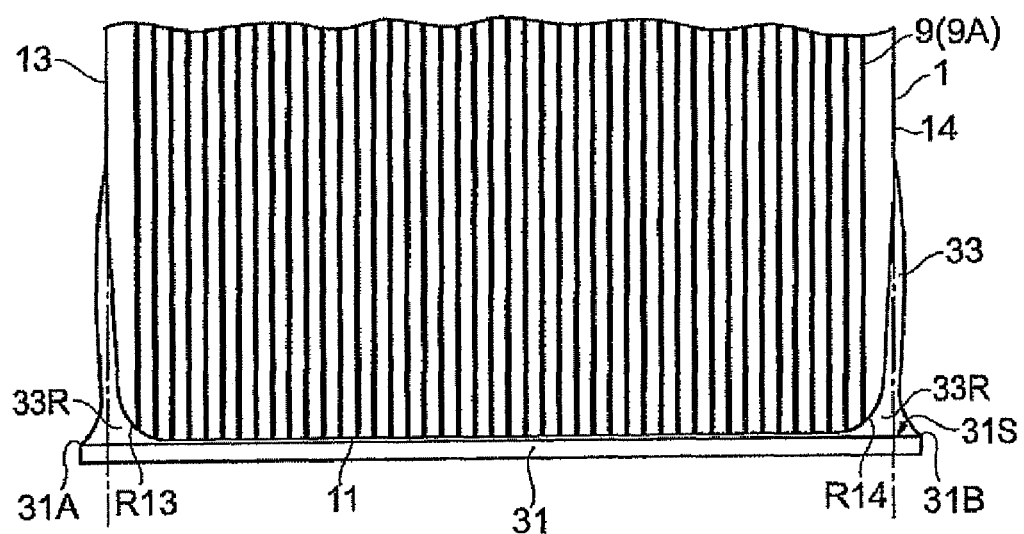
FIG. 7 is a cross-sectional view illustrating a state in which the electrically conductive green sheet is attached to the end surface of the chip element.
Figure 8C:
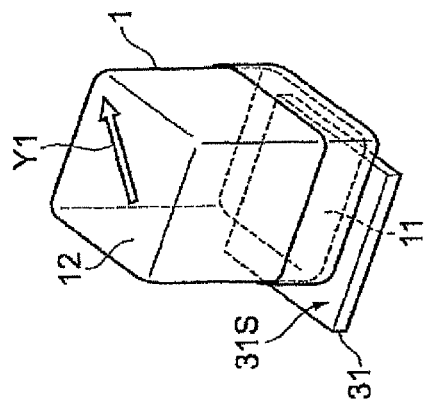
FIG. 8 illustrates an electrically conductive sheet attachment step in the method for manufacturing the electronic component of Embodiment 1.
Figure 8F:
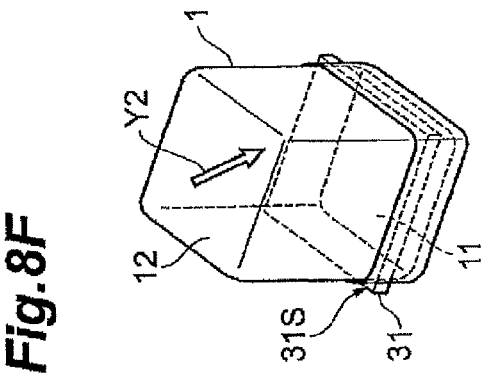
Figure 8B:
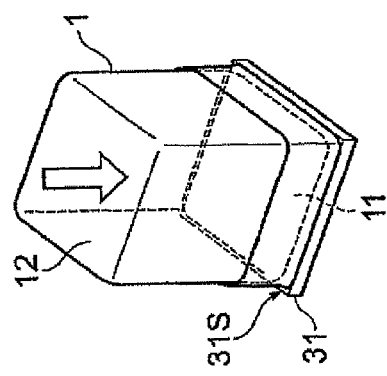
Figure 8E:
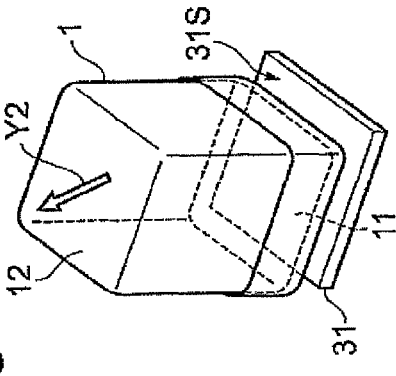
Figure 8A:
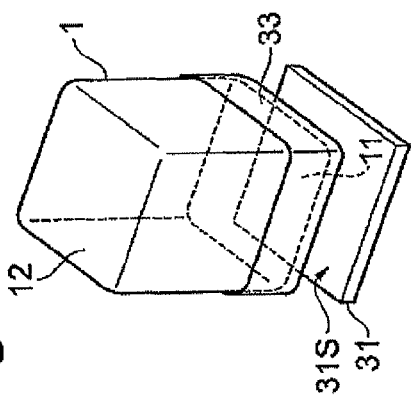
Figure 8D:
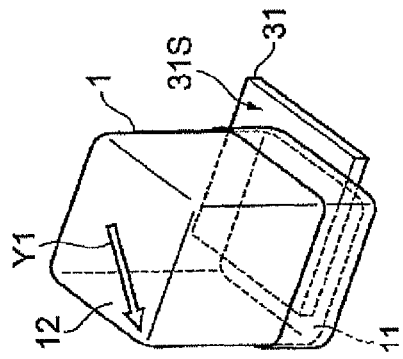

Then, in the step of attaching electrically conductive sheet S4, a main surface 31S of the electrically conductive green sheet 31 is attached to the end surface 11 of the chip element 1 as shown in FIG. 5. The end surface 11 of the chip element 1 having the electrically conductive paste 33 applied thereon is join together with the electrically conductive green sheet 31 and pressed against it. The state in which the electrically conductive green sheet 31 is attached to the end surface 11 of the chip element 1 is shown in FIG. 6 and FIG. 7.

In this state, the electrically conductive green sheet 31 is attached to the chip element 1 so that edges 31A to 31D of a main surface 31S of the electrically conductive green sheet 31 overlap the side surfaces 13 to 16 of the chip element 1 or positioned outside the side surfaces 13 to 16, when viewed from the direction perpendicular to the electrically conductive green sheet 31. Thus, the edge 31A of the electrically conductive green sheet 31 is positioned outside the side surface 13 in the direction normal to the side surface 13 of the chip element 1. Likewise, the edge 31B of the electrically conductive green sheet 31 is positioned outside the side surface 14 in the direction normal to the side surface 14 of the chip element 1. The edge 31C of the electrically conductive green sheet 31 is positioned outside the side surface 15 in the direction normal to the side surface 15 of the chip element 1. The edge 31D of the electrically conductive green sheet 31 is positioned outside the side surface 16 in the direction normal to the side surface 16 of the chip element 1. Thus, the electrically conductive green sheet 31 is positioned to overlap the ridge portions R13 to R16 as viewed from the direction perpendicular to the electrically conductive green sheet 31 and also to be opposite the end surface 11 and ridge portions R13 to R16 at a distance from the ridge portions R13 to R16.

Where the electrically conductive green sheet 31 is attached to the end surface 11 of the chip element 1, the electrically conductive paste 33 that adhered to the end surface 11 of the chip element 1 is pressed out. In the attached state, the edges 31A to 31D of the main surface 31S of the electrically conductive green sheet 31 are positioned outside the side surfaces 13 to 16. Therefore, a space is present between the main surface 31S of the electrically conductive green sheet 31 and the ridge portions R13 to R16 of the chip element 1. As a result, the electrically conductive paste 33 is pressed out and loaded into the space between the main surface 31S of the electrically conductive green sheet 31 and the ridge portions R13 to R16 of the chip element 1.

Thus, in the electrically conductive paste 33, the thickness of the paste portion 33R coated on the ridge portions R13 to R16 of the chip element 1 becomes large. In particular, paste portions RR coated on four corners of the end surface 11 of the chip element 1 in the electrically conductive paste 33 have the largest thickness. Further, the larger is the R (curvature radius) of the ridge portions R13 to R16, the larger is the space between the electrically conductive green sheet 31 and the ridge portions R13 to R16. Because the space is filled with the electrically conductive paste 33, the larger is the R of the ridge portions R13 to R16, the thicker is the paste portion 33R coated on the ridge portions R13 to R16.

When the electrically conductive green sheet 31 is attached it is preferred that the electrically conductive paste 33 is spread on the electrically conductive green sheet 31 as shown in FIG. 8. First, as shown in FIG. 8A, 8B, the end surface 11 of the chip element 1 that is applied with the electrically conductive paste 33 is attached to the electrically conductive green sheet 31. Then, in a state in which the electrically conductive green sheet 31 is attached to the end surface 11 via the electrically conductive paste 33, the electrically conductive sheet is moved reciprocatingly (scribing) with respect to the end surface 11 in the direction parallel to the end surface 11. Such reciprocating movement is performed along one diagonal direction Y1 from among two diagonal directions of the end surface 11, as shown in FIGS. 8C, 8D, and then along the other diagonal direction Y2 from among the two diagonal directions as shown in FIGS. 8E, 8F.

Because the electrically conductive green sheet 31 is drier than the electrically conductive paste 33, where the electrically conductive green sheet 31 is attached to the electrically conductive paste 33, the solvent of the electrically conductive paste 33 diffuses into the electrically conductive green sheet 31. As a result, the viscosity of the electrically conductive pate 33 increases and it becomes more difficult to press the electrically conductive paste out into the space between the electrically conductive green sheet 31 and the ridge portions R13 to R16 of the chip element 1. By contrast, as described above, the reciprocating movement can make it easier to press the electrically conductive paste 33 out into the space between the main surface 31S of the electrically conductive green sheet 31 and the ridge portions R13 to R16 of the chip element 1. In particular, by performing the reciprocating movement in two diagonal directions Y1, Y2 of the end surface 11, it is possible to load a sufficient amount of the electrically conductive paste 33 to the four corners of the end surface 11.

Figure 9A:
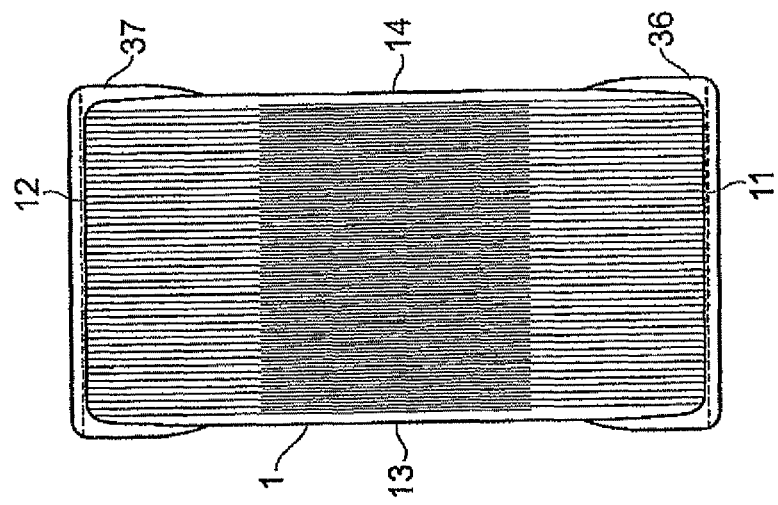
FIG. 9 illustrates step of attaching electrically conductive sheet in the method for manufacturing the electronic component of Embodiment 1.

Further, in the step S5, the electrically conductive paste 33 and electrically conductive green sheet 31 are dried, and an electrically conductive layer 34 is formed in which the electrically conductive paste 33 and electrically conductive green sheet 31 are integrated. Then, the step of application the electrically conductive paste S3, the step of attaching the electrically conductive sheet S4, and the drying step S5 are performed with respect to the end surface 12 of the chip element 1. As a result as shown in FIG. 9A, an electrically conductive layer 34 is formed on the end surface 11 of the chip element 1, and an electrically conductive layer 35 similar to the electrically conductive layer 34 is formed on the end surface 12.

Figure 9B:
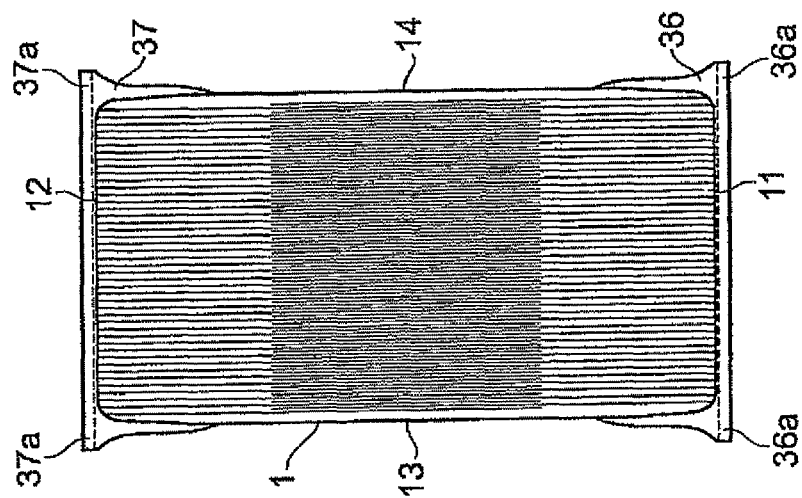
Figure 9C:
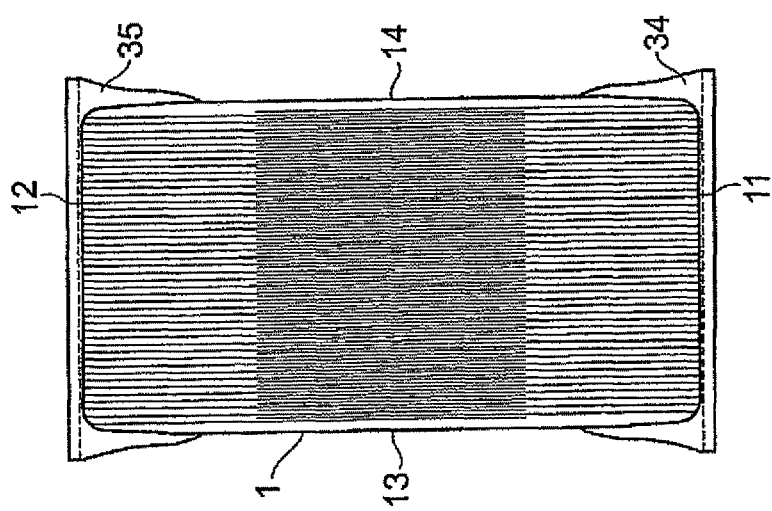

Then, in the sintering step S6, the electrically conductive layers 34, 35 are sintered to form sintered electrode layers 36, 37 (FIG. 9B). Where sintering is performed, the thickness of the portion formed by the electrically conductive paste 33 applied on the side surfaces 13 to 16 of the chip element 1 decrease. As a result a state is assumed in which the end portions 36a, 37a of the portions formed by the electrically conductive green sheet 31 in the sintered electrode layers 36, 37 protrude outside the side surfaces 13 to 16 of the chip element 1. The protruding end portions 36a, 37a are shaped by barrel polishing in the barrel polishing step S7 (FIG. 9C).

Figure 10:
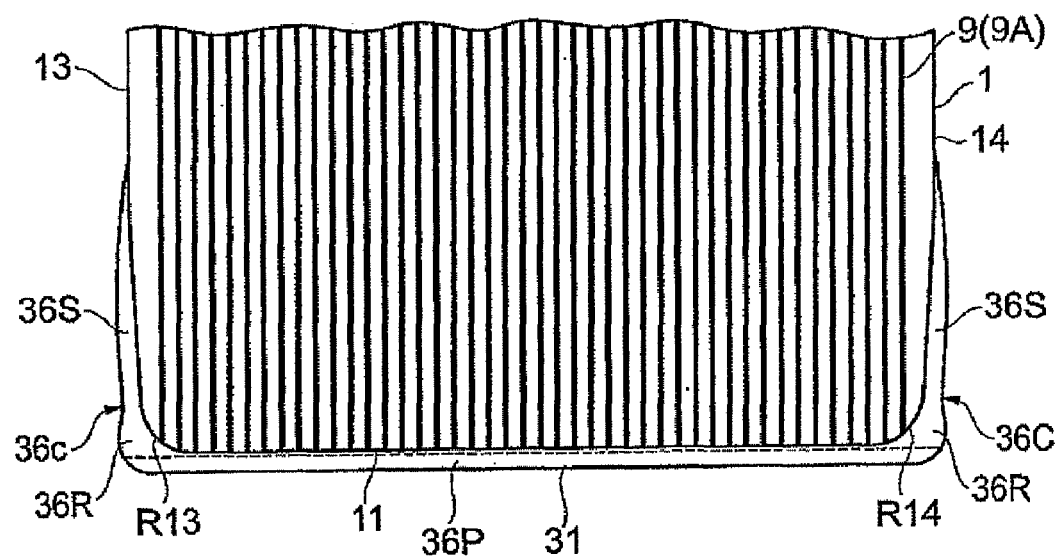
FIG. 10 is a cross-sectional view of the chip element with a sintered electrode layer attached thereto of Embodiment 1.

The sintered electrode layers 36, 37 formed in the above-described manner will be explained below with reference to FIG. 10. FIG. 10 is a cross-sectional view of the chip element equipped with sintered electrode layers of the present embodiment. The sintered electrode layer 36 includes a plane portion 36P covering the end surface 11 of the chip element 1, a side surface portion 36S covering portions of the side surfaces 13 to 16 on the side of the end surface 11 of the chip element 1, and a corner portion 36R positioned on the circumference of the plane portion 36P and covering the ridge portions R13 to R16 of the chip element 1.

The plane portion 36P of the sintered electrode layer 36 is a portion that is mainly formed by the electrically conductive green sheet 31. The surface of the plane portion 36P of the sintered electrode layer 36 is formed as a flat surface parallel to the end surface 11. The side surface portion 36S of the sintered electrode layer 36 is formed by the electrically conductive paste 33.

The corner portion 36R of the sintered electrode layer 36 includes a portion formed by the electrically conductive green sheet 31 and a portion formed by the electrically conductive paste 33 loaded between the main surface 31S of the electrically conductive green sheet 31 and the ridge portions R13 to R16 of the chip element 1. As a result, the thickness of the corner portion 36R of the sintered electrode layer 36 is larger than that of the plane portion 36P. The corner portion 36R covers the four corners of the end surface 11 of the chip element 1. The portions of the corner portion 36R covering the four corner have the largest thickness. Further, because the plane portion 36P of the sintered electrode layer 36 is flat, the R (curvature radius) of the outer surface in the corner portions 36R of the sintered electrode layer 36 is less than the R of the ridge portions R13 to R16 of the chip element 1.

Further, a concave neck can be formed between the corner portion 36R of the sintered electrode layer 36 and the side surface portion 36S. The sintered electrode layer 37 is formed at the end surface 12 of the chip element 1 to have the same shape as the sintered electrode layer 36.

Then, in the plating step S8, the sintered electrode layers 36, 37 are electroplated to form a plated electrode layer covering the sintered electrode layers 36, 37. For example, Ni plating is performed by a barrel plating method, a Ni plated layer is formed, and then Sn plating is performed and a Sn plated layer is formed. The sintering step S6, barrel polishing step S7, and plating step S8 are performed in the above described manner and the first and second external electrodes 3, 5 are formed (forming process). Because the plated layers are formed to have a small thickness along the surface of the sintered electrode layers 36, 37, the formed first and second external electrodes 3, 5 have the same shape as the sintered electrode layers 36, 37.

In the above-described method for manufacturing an electronic component of the present embodiment, the chip element 1 is attached to the electrically conductive paste 33 and electrically conductive green sheet 31 so that the electrically conductive green sheet 31 overlaps the ridge portions R13 to R16, R23 to R26 as viewed from the direction perpendicular to the electrically conductive green sheet 31 and is positioned opposite the end surfaces 11, 12 and ridge portions R13 to R16, R23 to R26 at a distance from the ridge portions R13 to R16, R23 to R26, and the electrically conductive paste 33 is present in a space sandwiched by the electrically conductive green sheet 31 and ridge portions R13 to R16, R23 to R26 and covers the ridge portions R13 to R16, R23 to R26. Then, the electrically conductive paste 33 and electrically conductive green sheet 31 are dried and sintered to form the first and second external electrodes 3, 5. Therefore, in the first and second external electrodes 3, 5, the thickness of the corner portions 3R, 5R covering the ridge portions R13 to R16, R23 to R26 of the chip element 1 is larger than that of the plane portions 3P, 5P covering the end surfaces 11, 12 of the chip element 1. Therefore, the adhesive strength between the first and second external electrodes 3, 5 and the chip element 1 is increased. As a result, the occurrence of solder leach can be inhibited.

Furthermore, since the electrically conductive green sheet 31 is attached to the end surfaces 11, 12, the first and second external electrodes 3, 5 formed on the end surfaces 11, 12 have plane portions 3P, 5P parallel to the end surfaces 11, 12. Therefore the R of the corner portions 3R, 5R of the first and second external electrodes 3, 5 decreases. As a result, the occurrence of a tombstone phenomenon in which the electronic component rises when reflow soldering is performed can be prevented.

In the method for manufacturing an electronic component of the present embodiment, in the step of application electrically conductive paste S3, the electrically conductive paste 33 is applied on the end surfaces 11, 12 of the chip element 1, and in the step of attaching electrically conductive sheet S4, the electrically conductive green sheet 31 is attached to the end surfaces 11, 12 via the electrically conductive paste 33, whereby the electrically conductive paste 33 applied to the end surfaces 11, 12 is pressed out between the main surface 31S of the electrically conductive green sheet 31 and the ridge portions R13 to R16, R23 to R26 of the chip element 1. Therefore, the thickness of the corner portions 3R, 5R covering the ridge portions R13 to R16, R23 to R26 of the chip element 1 is larger than that of the plane portions 3P, 5P covering the end surfaces 11, 12 of the chip element 1 and the first and second external electrodes 3, 5 with flat plane portions 3P, 5P can be easily formed.

In the method for manufacturing an electronic component of the present embodiment, in the step of attaching electrically conductive sheet S4, the electrically conductive green sheet 31 is moved reciprocatingly with respect to the end surfaces 11, 12 in the direction parallel to the end surfaces 11, 12 in a state in which the electrically conductive green sheet is attached to the end surfaces 11, 12 of the chip element 1 via the electrically conductive paste 33. In is case, the electrically conductive paste 33 that was attached to the end surfaces 11, 12 can be easily pressed out between the electrically conductive green sheet 31 and the ridge portions R13 to R16, R23 to R26 of the chip element 1. Further, an air in can be formed between the end surfaces 11, 12 of the chip element 1, electrically conductive paste 33, and electrically conductive green sheet 31. As a result, the electrically conductive green sheet 31 can be strongly adhered to the end surfaces 11, 12 of the chip element 1 via the electrically conductive paste 33 by the surface tension of the electrically conductive paste 33.

In particular, in the step of attaching electrically conductive sheet S4, the electrically conductive green sheet 31 is moved reciprocatingly in the direction parallel to the end surfaces 11, 12 and in the diagonal direction of the end surfaces 11, 12 in a state in which the electrically conductive green sheet is attached to the end surfaces 11, 12 of the chip element 1 via the electrically conductive paste 33. As a result the electrically conductive paste 33 attached to the end surfaces 11, 12 can be even more easily pressed out into the space between the electrically conductive green sheet 31 and ridge portions R13 to R16, R23 to R26. Furthermore, the electrically conductive paste 33 can be pressed out with good efficiency to the four corners of the end surfaces 11, 12.

In the method for manufacturing an electronic component of the present embodiment, the electrically conductive green sheet 31 is used. In this case, the electrically conductive green sheet 31 is dryer than the electrically conductive paste 33. Therefore, the solvent diffuses from the electrically conductive paste 33 into the electrically conductive green sheet 31 due a capillary phenomenon or the like. As a result the electrically conductive paste 33 and electrically conductive green sheet 31 are integrated and dried. The integrated electrically conductive paste 33 and electrically conductive green sheet 31 are then sintered. As a result, the occurrence of cracks between a portion constituted by the electrically conductive past and a portion constituted by the electrically conductive sheet in the first and second external electrodes 3, 5 can be inhibited.

In the method for manufacturing an electronic component of the present embodiment, the electrically conductive paste 33 includes a glass component, and the electrically conductive green sheet 31 does not include a glass component. The glass component is included in the chip element 1. Therefore, the electrically conductive paste can be strongly bonded to the chip element 1. Further, because the electrically conductive green sheet 31 that is attached to the outer side of the electrically conductive past 33 includes no glass component, when sintering is performed, the adhesion of the electrode layers 34, 35 of a plurality of chip elements 1 to the peripheral components can be inhibited. Furthermore, because the electrically conductive green sheet 31 includes no glass component, the content ratio of the electrically conductive material can be increased accordingly and electric conductivity of the first and second external electrodes 3, 5 can be increased. Furthermore, when plating is performed on the sintered electrode layers 36, 37, because the electrically conductive green sheet 31 includes no glass component, adhesion between the plated film and the sintered electrode layers 36, 37 can be increased and peeling between the sintered electrode layers 36, 37 and the plated layer can be inhibited.

In the method for manufacturing an electronic component of the present embodiment, barrel polishing that forms the shape is performed and the sintered electrode layers 36, 37 are formed after the electrically conductive layers 34, 35 have been sintered. As a result, the shape can be formed when a portion formed by the electrically conductive green sheet 31 protrudes after the electrically conductive layers 34, 35 have been sintered. Therefore, mounting defects caused by shape defects of the first and second external electrodes 3, 5 can be inhibited.

The present invention is not limited to the above-described embodiment and can be modified in a variety of ways.

For example, in the present embodiment, the size of one side of the electrically conductive green sheet 31 is made larger than the size of the chip element 1 in the transverse direction, and when the electrically conductive green sheet 31 is attached to the chip element 1, the edges 31A to 31D of the main surface 31S of the electrically conductive green sheet 31 are positioned outside of the side surfaces 13 to 16 of the chip element 1. The present invention is not limited to such a configuration. Thus, a configuration may be employed in which when the electrically conductive green sheet 31 is attached to the end surfaces 11, 12 of the chip element 1, the electrically conductive green sheet 31 overlaps the ridge portions R13 to R16 as viewed from the direction perpendicular to the electrically conductive green sheet 31 and is positioned opposite the end surface 11 and ridge portions R13 to R16 at a distance from the ridge portions R13 to R16, and a space is formed between the main surface 31S of the electrically conductive green sheet 31 and the ridge portions R13 to R16, 123 to R26 of the chip element 1. The electrically conductive paste 33 may be applied to the space between the main see 31S of the electrically conductive green sheet 31 and the ridge portions R13 to R16, R23 to R26 of the chip element 1.

Further, in the present embodiment, the electrically conductive green sheet 31 is attached to the chip element 1 after the electrically conductive paste 33 has been applied on the end surfaces 11, 12 of the chip element 1, but this feature is not limiting. Thus, the electrically conductive paste 33 may be applied between the main surface 31S of the electrically conductive green sheet 31 and the ridge portions R13 to R16, R23 to R26 of the chip element 1 after the electrically conductive green sheet 31 has been attached to the end surfaces 11, 12 of the chip element 1.

Further, for example in the present embodiment the electronic component C is a capacitor, but it may also be a varistor. In this case, the chip element 1 has a varistor layer instead of the above-described dielectric layer 7. The varistor layer contains ZnO as the main component and also contains single metal elements such as rare earth metal elements, Co, elements of Group IIIb (B, Al, Ga, In), Si, Cr, Mo, alkali metal elements (K, Rb, Cs), and alkaline earth metal elements (Mg, Ca, Sr, Ba) and oxides thereof. A chip element in which the varistor layer an internal electrode layer are laminated demonstrates a voltage nonlinear characteristic.

Further, in the present embodiment, a sheet piece (electrically conductive green sheet 31) is formed by cutting the electrically conductive green sheet preform 31b to match the shape of the end surfaces 11, 12 of the chip element 1, and this sheet piece (electrically conductive green sheet 31) is attached to the end surfaces 11, 12. By contrast, it is also possible to attach the end surfaces 11 of a plurality of chip elements 1 coated with the electrically conductive paste 33 to the electrically conductive green sheet preform 31b and then cut the electrically conductive green sheet preform 31b.

Moreover, in the present embodiment, the electrically conductive green sheet 31 is used, but an electrically conductive metal sheet may be used instead thereof.

Embodiment 2

Figure 11:
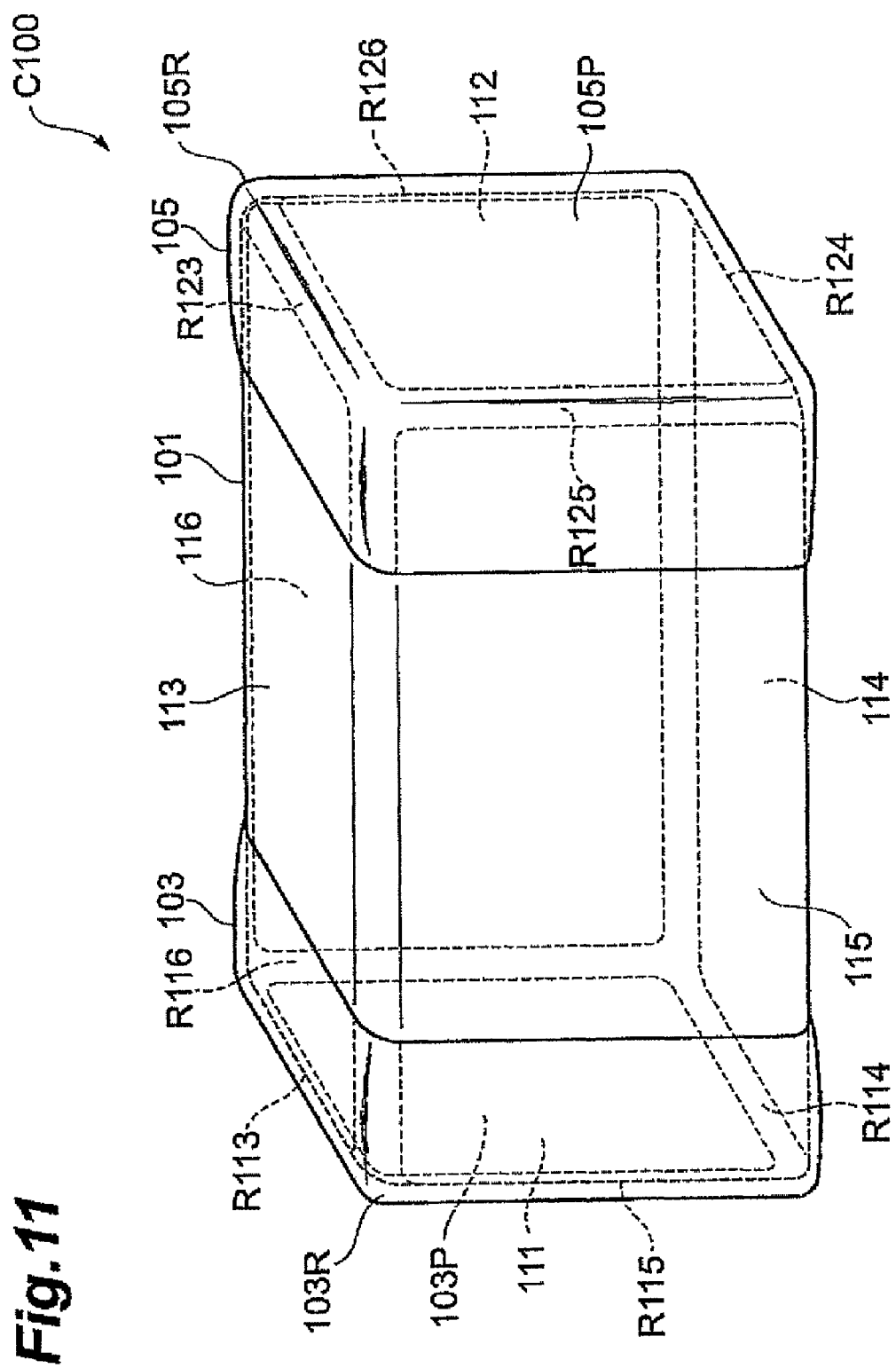
FIG. 11 is a perspective view of the electronic component of Embodiment 2.
Figure 12:
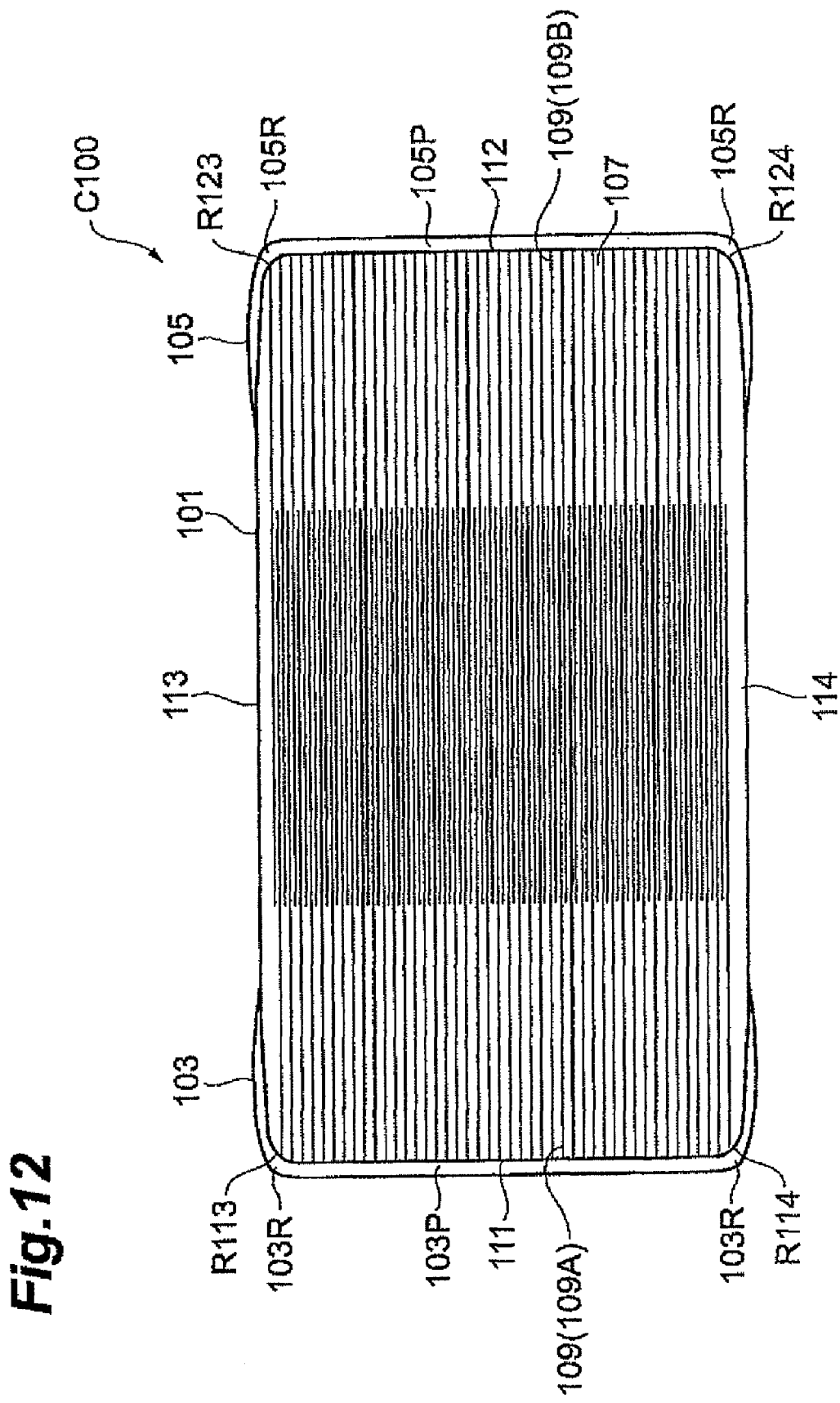
FIG. 12 is a cross-sectional view of the electronic component of Embodiment 2.

An electronic component C100 of Embodiment 2 will be explained below with reference to FIG. 11 and FIG. 12. FIG. 11 is a perspective view of the electronic component of the present embodiment. FIG. 12 is a cross-sectional view of the electronic component of the present embodiment. The electronic component C100 of the present embodiment is a chip-like multilayer ceramic capacitor. The electronic component C100 is in the form of a substantially rectangular parallelepiped and, for example, has a let in the longitudinal (transverse) direction of about 1.0 mm and a length in the width direction and a length in the depth direction of about 0.5 mm The electronic component C100 includes a chip element 101 in the form of a substantially rectangular parallelepiped, and a first external electrode 103 and a second external electrode 105 formed on respective end portions of the chip element 101. The chip element 101 has mutually opposing end surface 111 and end surface 112, mutually opposing side surface 113 and side surface 114 that are perpendicular to the end surfaces 111, 112, and mutually opposing side surface 115 and side surface 116 that are perpendicular to the end surfaces 111, 112 and side surfaces 113, 114.

Further, the chip element 101 has a ridge portion R113 between the end surface 111 and side surface 113, a ridge portion R114 between the end surface 111 and side surface 114, a ridge portion R115 between the end surface 111 and side surface 115, a ridge portion R116 between the end surface 111 and side surface 116, a ridge portion R123 between the end surface 112 and side surface 113, a ridge portion R124 between the end surface 112 and side surface 114, a ridge portion R125 between the end surface 112 and side surface 115, and a ridge portion R126 between the end surface 112 and side surface 116. The ridge portions R113 to R116, R123 to R126 are rounded by polishing the chip element 101 (chamfering is performed). The rounding by polishing is performed to prevent the ridge portions R113 to R116, R123 to R126 of the chip element 101 from damage. The curvature radius of ridge portions in the chip element 101 is, for example, about 5% to 10% the length of the electronic component C100 in the width direction.

The first external electrode 103 covers the end surface 111 in the chip element 101, the ridge portion R113 between the end surface 111 and side surface 113, the ridge portion R114 between the end surface 111 and side surface 114, the ridge portion R115 between the end surface 111 and side surface 115, and the ridge portion R116 between the end surface 111 and side surface 116. The first external electrode 103 also covers portions of the side surfaces 113 to 116 on the side of the end surface 111. Such a first external electrode 103 includes a flat plane portion 103P that covers the end surface 111 and a corner portion 103R that is positioned on the circumference of the plane portion 103P and covers the ridge portions R113 to R116 of the chip element 101. In the first external electrode 103, the thickness of the corner portion 103R is larger than that of the plane portion 103P.

The second external electrode 105 covers an end surface 112 in the chip element 101, the ridge portion R123 between the end surface 112 and side surface 113, the ridge portion R124 between the end surface 112 and side surface 114, the ridge portion R125 between the end surface 112 and side surface 115, and the ridge portion R126 between the end surface 112 and side surface 116. The second external electrode 105 also covers portions of the side surfaces 113 to 116 on the side of the end surface 112. Such a second external electrode 105 includes a flat plane portion 105P that covers the end surface 112 and a corner portion 105R that is positioned on the circumference of the plane portion 105P and covers the ridge portions R123 to R126 of the chip element 101. In the second external electrode 105, the thickness of the corner portion 105R is larger than that of the plane portion 105P.

As shown in FIG. 12, the chip element 101 is configured by alternately laminating a plurality of dielectric layers 107 and a plurality of internal electrode layers 109. The lamination direction is perpendicular to the direction in which the end surfaces 111, 112 formed on a pair of the first external electrode 103 and second external electrode 105 face each other arid parallel to the direction in which the side surface 113 and side surface 114 face each other. In FIG. 12 the number of the dielectric layers 107 and internal electrode layers 109 is such that the layers can be visually recognized in the drawing, but actually from several tens to about five hundreds dielectric layers 107 and internal electrode layers 109 are laminated to obtain the necessary electric characteristics. Further, actual dielectric layers 107 are integrated to a degree such that boundaries therebetween cannot be visually recognized. The dielectric layers 107 are composed of a dielectric material, for example, of a $BaTiO_3$ system, $Ba(Ti,Zr)O_3$ system, or a, $Ca)TiO_3$ system.

The internal electrode layers 109 are laminated to reach the ridge portions R113 to R116, R123 to R126 of the chip element 101 in order to reduce the size and increase the capacity thereof. The internal electrode layers 109 are composed of an electrically conductive material such as a basic metal, for example Ni.

The internal electrode layers 109 include a first internal electrode layers 109A and a second internal electrode layers 109B. The first internal electrode layers 109A are shifted toward the first external electrode 103 with respect to the second internal electrode layers 109B, and the end surfaces of the first internal electrode layers are exposed from the end surface 111 and ridge portions R113, R114 of the chip element 101. As a result, the first internal electrode layers 109A are mechanically and electrically connected to the first external electrode 103. The second internal electrode layers 109B are shifted toward the second external electrode 105 with respect to the is internal electrode layers 109A, and the end surfaces of the second internal electrode layers are exposed from the end surface 112 and ridge portions R123, R124 of the chip element 101. As a result, the second internal electrode layers 109B are mechanically and electrically connected to the second external electrode 105.

In the first and second external electrodes 103, 105 of the above-described electronic component C100, the thickness of the corner portions 103R, 105R is larger than that of the plane portions 103P, 105P. Therefore, the adhesive strength between the first and second external electrodes 103, 105 and the chip element 101 is increased and the occurrence of solder leach can be inhibited. The thickness of the plane portions 103P, 105P and corner portions 103R, 105R in the first and second external electrodes 103, 105 is the thickness in the direction normal to the surface of the chip element 101 with which the respective portions come into contact.

In the first and second external electrodes 103, 105 of the electronic component C100, in addition to the thickness of the corner portions 103R, 105R being larger than the thickness of the plane portions 103P, 105P, the plane portions 103P, 105P are flat. Therefore, the R (curvature radius) of the corner portions 1034 105R is small. As a result the occurrence of a tombstone phenomenon in which the electronic component rises when reflow soldering is performed can be prevented.

Figure 13:
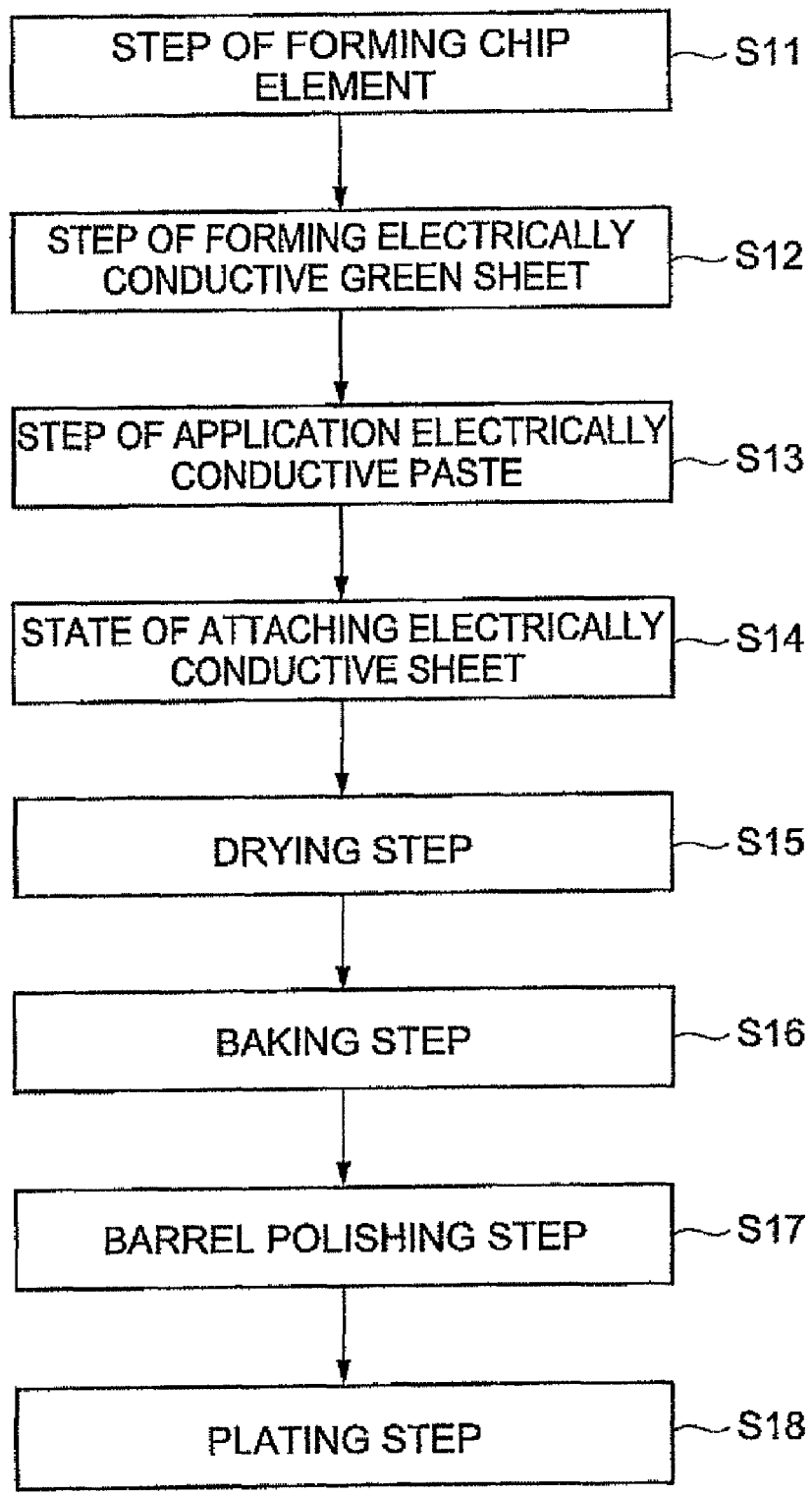
FIG. 13 is a flowchart illustrating a method for manufacturing the electronic component of Embodiment 2.

A method for manufacturing the electronic component of the present embodiment will be described below. As shown in FIG. 13, the method for manufacturing the electronic component of the present embodiment includes a step of forming chip element (preparation step) S11, a step of forming electrically conductive green sheet S12, a step of application electrically conductive paste (first a attachment step) S13, a step of attaching electrically conductive sheet (second attachment step) S14, a drying step S15, a sintering step S16, a barrel polishing step S17, and a plating step S18. Each of the steps will be described below in greater detail.

First, in the step of forming chip element S11, the chip element 101 is formed. In order to form the chip element 101, first ceramic green sheets that will serve as the dielectric layer 107 are formed. The ceramic green sheets are formed by coating ceramic slurry on PET films by using a doctor blade method or the like, and then drying. The ceramic slurry is obtained, for example, by adding a solvent, a plasticizer, a glass frit, and the like to a dielectric material containing barium titanate as the main component, mixing, and dispersing. An electrode pattern that will serve as the internal electrode layers 109 is screen printed on the formed ceramic green sheet and dried. An electrode paste for printing the electrode pattern is obtained by mixing a binder or a solvent with a Ni powder.

A plurality of green sheets provided with electrode patterns are thus formed and laminated. The laminate of the green sheets provided with the electrode patterns is cut and a laminated chip in the form of a rectangular parallelepiped is formed. The laminated chip is sintered. The sintered laminated chip is barrel polished to round the ridge portions of the rectangular parallelepiped. The aforementioned chip element 101 is manufactured in the above-described manner.

Figure 14A:
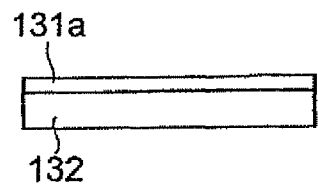
FIG. 14 illustrates a method for forming an electrically conductive green sheet of Embodiment 2.

On tie other hand, in the step of forming electrically conductive green sheet S12, the electrically conductive green sheet is formed by the procedure illustrated by FIG. 14. FIG. 14 shows a method for forming the electrically conductive green sheet of the present embodiment. First, as shown in FIG. 14A, a paste for the electrically conductive green sheet is coated on a PET film 132 to a thickness of about 100 μm. The paste for the electrically conductive green sheet is obtained by mixing a conductive powder of silver, palladium, silver-palladium, or copper with a resinous binder and an organic solvent.

Figure 14B:
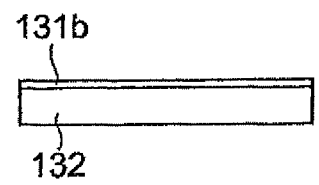
Figure 14C:
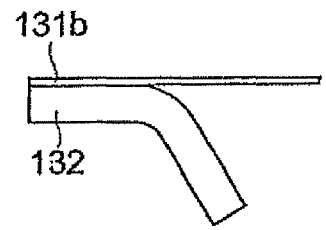

The paste 131a coated on the PET film 132 is damp-dried by far-infrared radiation or the like to form electrically conductive green sheet preform 131b (FIG. 14B). After damp-drying, the electrically conductive green sheet preform 131b is not fully dried and the organic solvent remains therein. The thickness of the electrically conductive green sheet preform 131b is about 30 μm to 60 μm. Then, as shown in FIG. 14C, the PET film 132 is peeled off from the electrically conductive green sheet preform 131b.

The electrically conductive green sheet preform 131b is then cut to the same shape as the end surfaces 111, 112 of the chip element 101 to form electrically conductive green sheets 131. The end surface 111 and end surface 112 of the chip element 101 of the present embodiment have the same square shape, and the electrically conductive green sheet 131 also has the same square shape. The size of the electrically conductive green sheet 131 is preferably such that one side thereof is less than the width of the chip element 101, and it is preferred that one side be about 90% to 95% the width of the chip element 101. The width of the chip element 101, as referred to herein, is the distance between the mutually opposing side surface 113 and side surface 114, or the distance between the mutually opposing side surface 115 and side surface 116. The electrically conductive green sheet 131 is in a state in which it includes the electrically conductive powder and the binder Then, in the step of application electrically conductive paste S13, the electrically conductive paste is applied on the chip element 101. The electrically conductive paste is obtained by adding glass frit to the components of the paste for the electrically conductive green sheet. The end surface 111 of the chip element 101 is oriented downward and the end surface 111, ridge portions R113 to R116, and portions of the side surfaces 113 to 116 on the side of the end surface 111 are dipped into the electrically conductive paste. The electrically conductive paste is thus coated on the end surface 111, ridge portions R113 to R116, and portions of the side surfaces 113 to 116 on the side of the end surface 111 of the chip element 101.

Figure 15:
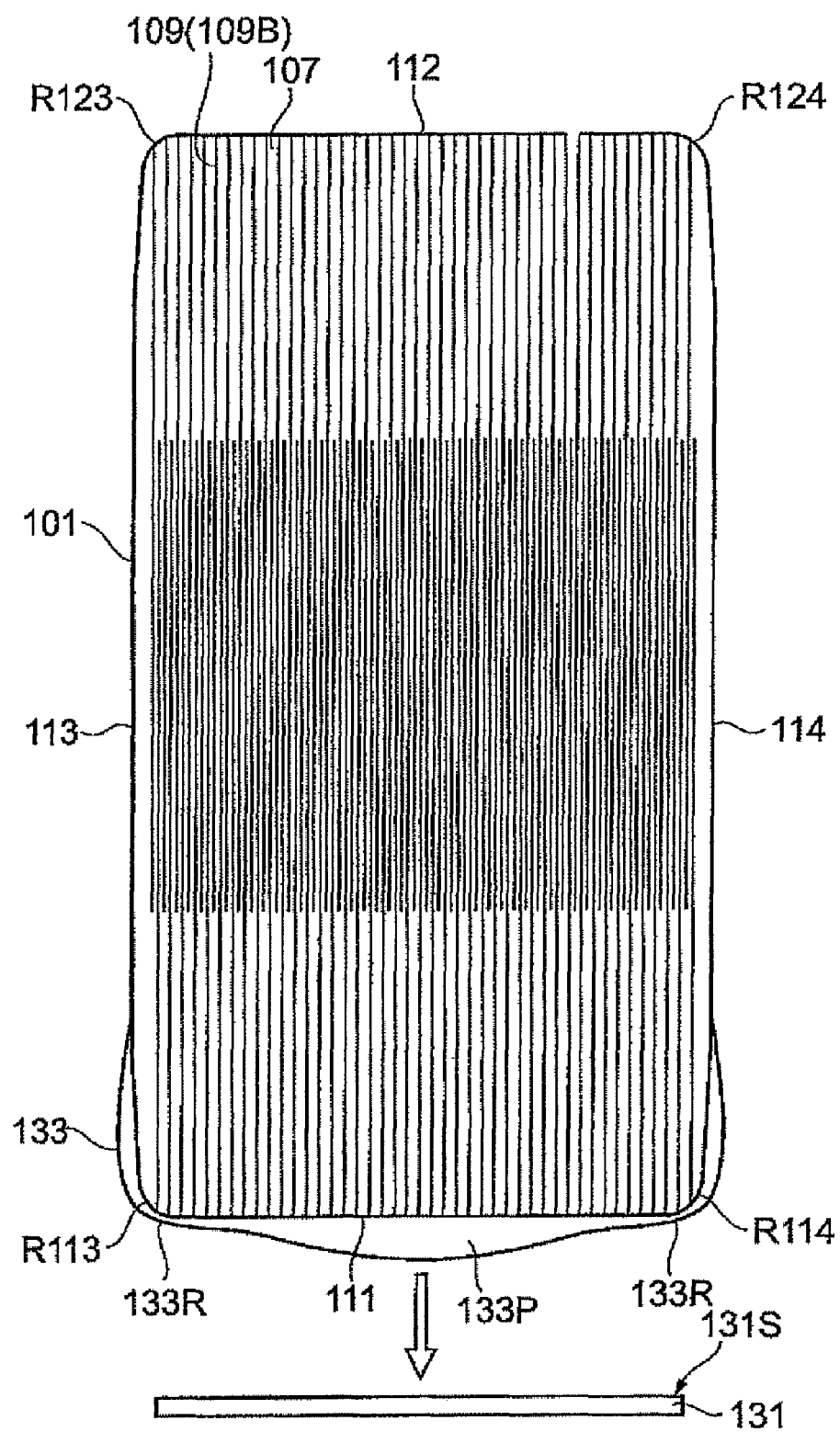
FIG. 15 is a cross-sectional view illustrating step of application electrically conductive paste and step of attaching electrically conductive sheet of Embodiment 2.

The state after applying the electrically conductive paste 133 is shown in FIG. 15. FIG. 15 is a cross-sectional view illustrating the step of application electrically conductive paste S13 and the step of attaching electrically conductive sheet S14 in the present embodiment As shown in FIG. 15, the electrically conductive paste 133 is coated on the end surface 111, ridge portions R113 to R116, and portions of the side surfaces 113 to 116 on the side of the end surface 111 of the chip element 101. In a state in which the end surface 111 faces down, the electrically conductive paste 133 gathers below the end surface 111 of the chip element 101 under the effect of surface tension and gravity. As a result, the thickness of the electrically conductive paste in a paste portion 133R coated on the ridge portions R113 to R116 of the chip element 101 in the electrically conductive paste 133 is less tan that of a portion 133P coated on the end surface 111. Further, the portion 133P of the coated electrically conductive paste 133 has a convex curved surface.

Figure 16:
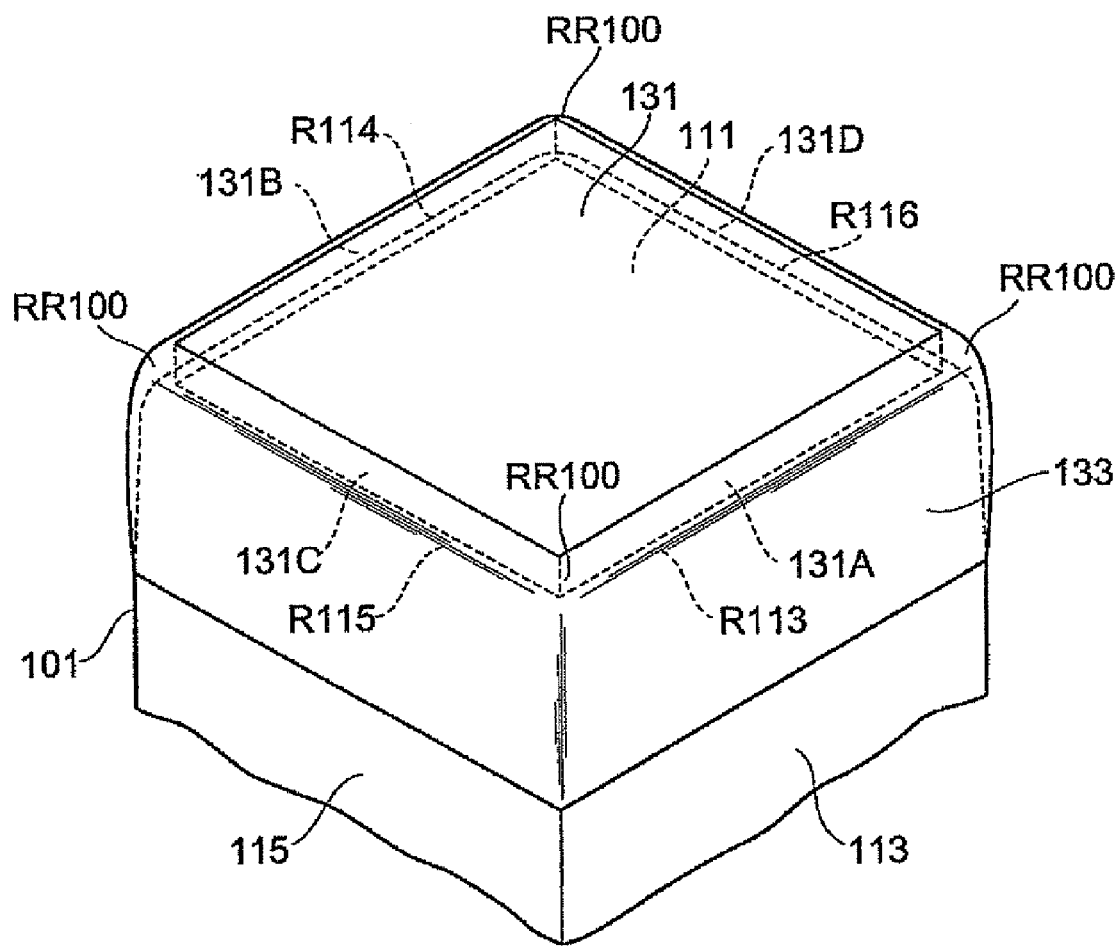
FIG. 16 is a perspective view illustrating a state in which the electrically conductive green sheet is attached to an end surface of the chip element.
Figure 17:
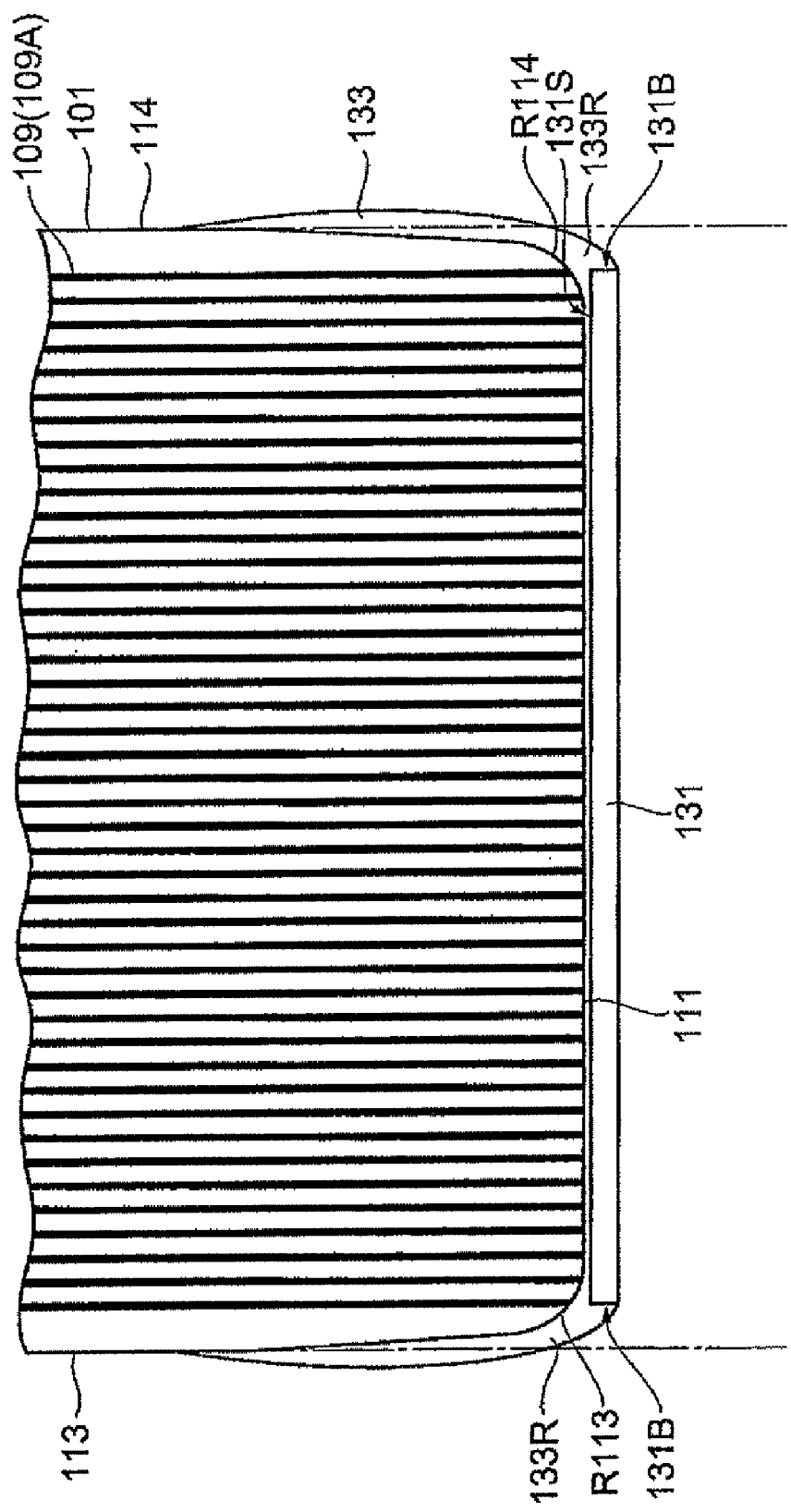
FIG. 17 is a cross-sectional view illustrating a state in which the electrically conductive green sheet is attached to the end surface of the chip element.
Figure 18A:
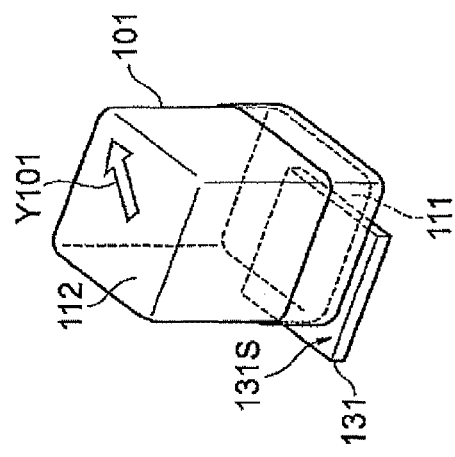
FIG. 18 illustrates step of attaching electrically conductive sheet in the method for manufacturing the electronic component of Embodiment 2.
Figure 18B:
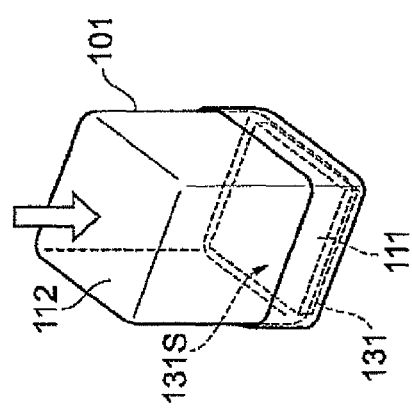
Figure 18C:
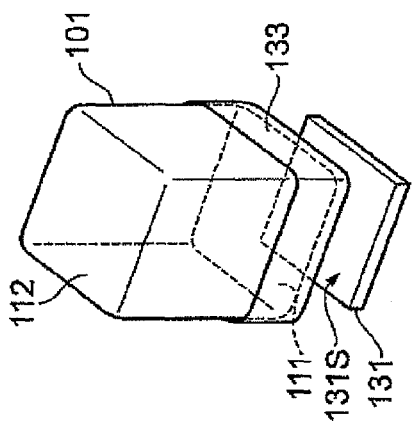
Figure 18D:
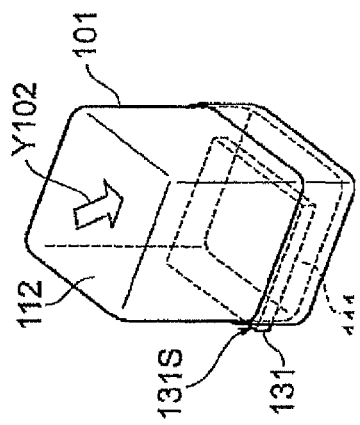
Figure 18E:
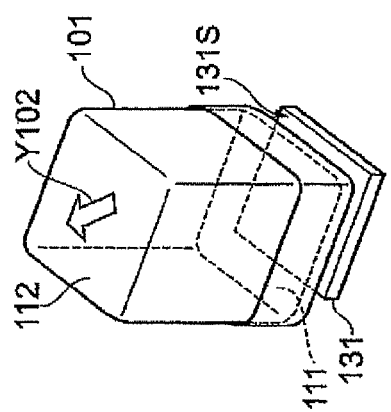
Figure 18F:
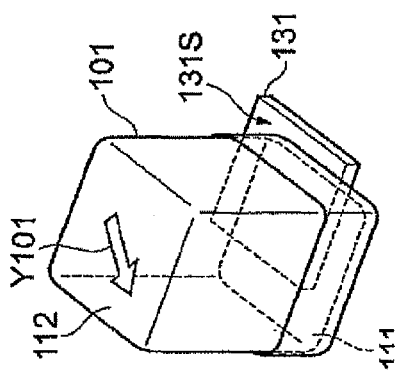

Then, in the step of attaching electrically conductive sheet S14, a main surface 131S of the electrically conductive green sheet 131 is attached via the electrically conductive past 133 to the end surface 111 of the chip element 101 as shown in FIG. 15. The end surface 111 of the chip element 101 having the electrically conductive paste 133 applied thereon is join together with the electrically conductive green sheet 131 and pressed against it. The state in which the electrically conductive green sheet 131 is attached to the end surface 111 of the chip element 101 is shown in FIG. 16 and FIG. 17.

In this state, the electrically conductive green sheet 131 is attached to the chip element 101 so that end surfaces 131A to 131D of the electrically conductive green sheet 131 are positioned on the inside of the side surfaces 113 to 116 of the chip element 101. Thus, the end surface 131A of the electrically conductive green sheet 131 is positioned on the inside of the side surface 113 in the direction normal to the side surface 113 of the chip element 101. Likewise, the end surface 131B of the electrically conductive green sheet 131 is positioned on the inside of the side surface 114 in the direction normal to the side surface 114 of the chip element 101. The end surface 131C of the electrically conductive green sheet 131 is positioned on the inside of the side surface 115 in the direction normal to the side surface 115 of the chip element 101. The end surface 131D of the electrically conductive green sheet 131 is positioned on the inside of the side surface 116 in the direction normal to the side surface 116 of the chip element 101. Thus, the end surfaces 131A to 131D of the electrically conductive green sheet 131 overlap the ridge portions R113 to R116 in the longitudinal direction of the ridge portions R113 to R116, as viewed from the direction perpendicular to the electrically conductive green sheet 131.

Where the electrically conductive green sheet 131 is attached to the end surface 111 of the chip element 101, the electrically conductive paste 133 that adhered to the end surface 111 of the chip element 101 is pressed out. In the attached state, the end surfaces 131A to 131D of the electrically conductive green sheet 131 are positioned on the inside of the side surfaces 113 to 116. Therefore, the electrically conductive paste 133 is pressed out to be present over a region from the ridge portions R113 to R116 of the chip element 101 to the end surfaces 131A to 131D of the electrically conductive green sheet 131 to cover the ridge portions. Further, a space is present between the main surface 131S of the electrically conductive green sheet 131 and the ridge portions R113 to R116 of the chip element 101. As a result, the electrically conductive paste 133 is pressed out and loaded into the space between the main surface 131S of the electrically conductive green sheet 131 and the ridge portions R113 to R116 of the chip element 101.

Thus, in the electrically conductive paste 13S, the thickness of the paste portion 133R coated on the ridge portions R113 to R116 of the chip element 101 becomes large. In particular, paste portions RR100 coated on four corners of the end surface 111 of the chip element 101 in the electrically conductive paste 133 have the largest thickness. Further the larger is the curvature radius of the ridge portions R113 to R116, the larger is the space between the electrically conductive green sheet 131 and the ridge portions R113 to R116. Because the space is filled with the electrically conductive paste 133, the larger is the R of the ridge portions R113 to R116, the thicker is the paste portion 133R coated on the ridge portions R113 to R116.

When the electrically conductive green sheet 131 is attached, it is preferred that the electrically conductive paste 133 is spread on the electrically conductive green sheet 131 as shown in FIG. 18. First, as shown in FIGS. 18S, 18B, the end surface 111 of the chip element 101 that is applied with the electrically conductive paste 133 is attached to the electrically conductive green sheet 131. Then in a sate in which the electrically conductive green sheet 131 is attached to the end surface 111 via the electrically conductive paste 133, the electrically conductive sheet is moved reciprocatingly (scribing) with respect to the end surface 111 in the direction parallel to the end surface 111. Such reciprocating movement is performed along one diagonal direction Y101 from among two diagonal directions of the end surface 111, as shown in FIGS. 18C, 18D, and then along the other diagonal direction Y102 from among the two diagonal directions, as shown in FIGS. 18E, 18F.

Because the electrically conductive green sheet 131 is drier tan the electrically conductive paste 133, where the electrically conductive green sheet 131 is attached to the electrically conductive paste 133, the solvent fraction of the electrically conductive paste 133 diffuses into the electrically conductive green sheet 131. As a result, the viscosity of the electrically conductive pate 133 increases and it becomes more difficult to press the electrically conductive paste out into the space between the electrically conductive green sheet 131 and the ridge portions R113 to R116 of the chip element 101. By contrast, as described above, the reciprocating movement can make it easier to press the electrically conductive paste 133 out into the space between the main surface 131S of the electrically conductive green sheet 131 and the ridge portions R113 to R116 of the chip element 101. In particular, by performing the reciprocating movement in two diagonal directions Y101, Y102 of the end surface 111, it is possible to load a sufficient amount of the electrically conductive paste 133 to the four corners of the end surface 111.

Further, in the drying step S15, the electrically conductive paste 133 and electrically conductive green sheet 131 are dried, and an electrically conductive layer is formed in which the electrically conductive paste 133 and electrically conductive green sheet 131 are integrated. Then, the step of application the electrically conductive paste S13, the step of attaching the electrically conductive sheet S14, and the drying step S15 are performed with respect to the end surface 112 of the chip element 101. As a result, an electrically conductive layer similar to the electrically conductive layer formed on the end surface 111 is also formed on the end surface 112 of the chip element 101. Then, in the sintering step S16, the electrically conductive layers are sintered to form sintered electrode layers. In the barrel polishing step S17, the sintered electrode layers are shaped by barrel polishing.

Figure 19:
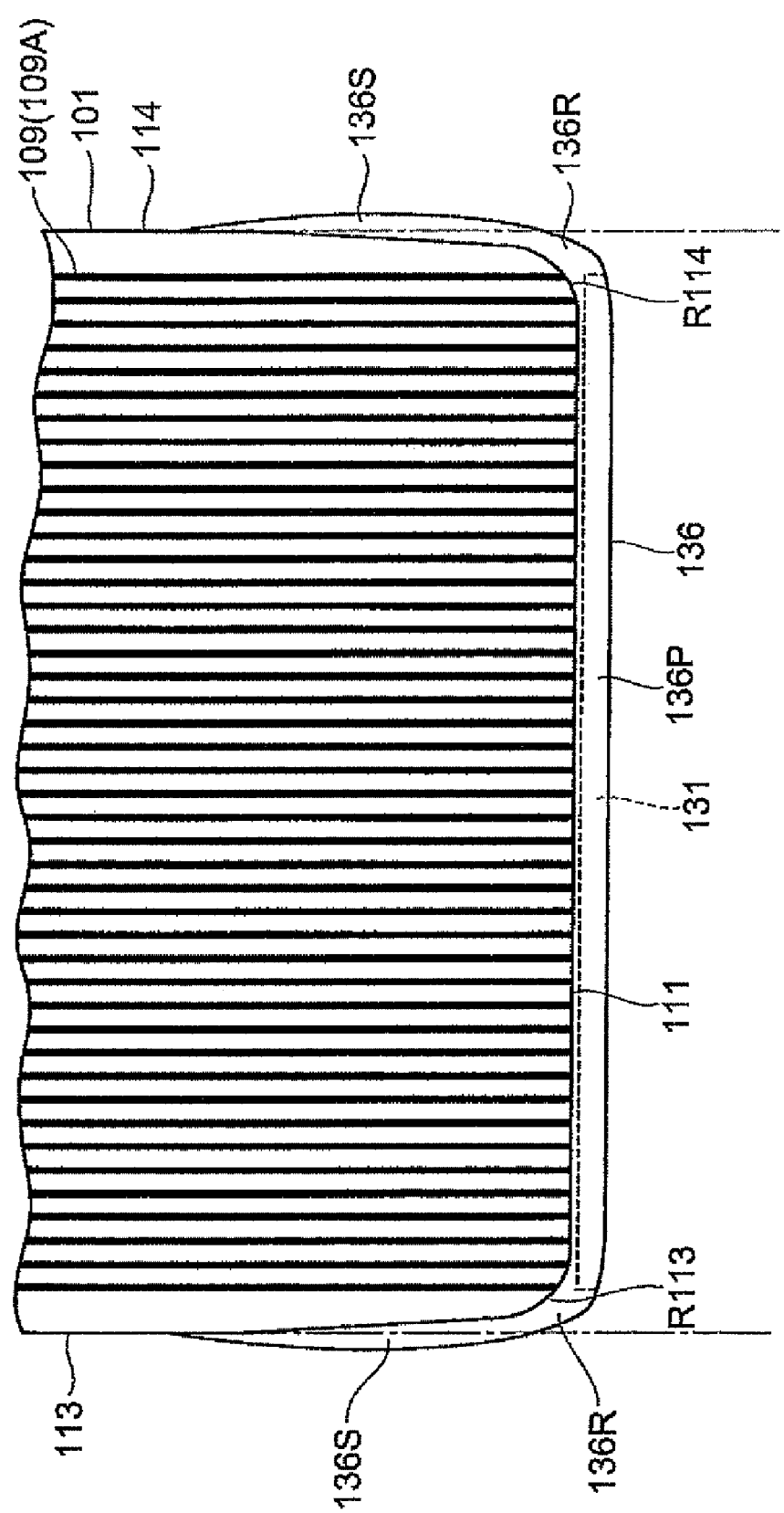
FIG. 19 is a cross-sectional view of the chip element with a sintered electrode layer attached thereto of Embodiment 2.

The sintered electrode layer 136 formed in the above-described manner will be explained below with reference to FIG. 19. FIG. 19 is a cross-sectional view of the chip element equipped with sintered electrode layer of the present embodiment. The sintered electrode layer 136 includes a plane portion 136 covering the end surface 111 of the chip element 101, a side surface portion 136S covering portions of the side surfaces 113 to 116 on the side of the end surface 111 of the chip element 101, and an corner portion 136R positioned on the circumference of the plane portion 136P and covering the ridge portions R113 to R116 of the chip element 101.

The plane portion 136P of the sintered electrode layer 136 is a portion that is mainly formed by the electrically conductive green sheet 131. The surface of the plane portion 136P of the sintered electrode layer 136 is formed as a flat surface parallel to the end surface 111. The side surface portion 136S of the sintered electrode layer 136 is formed by the electrically conductive paste 133.

The corner portion 136R of the sintered electrode layer 136 includes a portion formed by the electrically conductive green sheet 131 and a portion formed by the electrically conductive paste 133 that covers the ridge portions R113 to R116 within a region from the ridge portions R113 to R116 of the chip element 101 to the end surfaces 131A to 131D of the electrically conductive green sheet 131. The electrically conductive paste 133 of this portion includes a portion formed by the electrically conductive paste 133 loaded between the main surface 131S of the electrically conductive green sheet 131 and the ridge portions R113 to R116 of the chip element 101. As a result the thickness of the corner portion 136R of the sintered electrode layer 136 is larger than that of the plane portion 136P. The corner portion 136R covers the four corners of the end surface 11 of the chip element 101. The portions of the corner portion 136R covering the four corner have the largest thickness. Further, because the plane portion 136P of the sintered electrode layer 136 is flat, the curvature radius of the outer surface in the corner portions 136R of the sintered electrode layer 136 is less than the R (curvature radius) of the ridge portions R113 to R116 of the chip element 101. A sintered electrode similar to the sintered electrode layer 136 is also formed on the end surface 112 of the chip element 101.

Then, in the plating step S18, the sintered electrode layer 136 is electroplated to form a plated electrode layer covering the sintered electrode layer 136. For example, Ni plating is performed by a barrel plating method, a Ni plated layer is formed, and then Sn plating is performed and a Sn plated layer is formed. The sintering step S16, barrel polishing step S17, and plating step S18 are performed in the above-described manner and the first and second external electrodes 103, 105 are formed (forming process). Because the plated layers are formed to have a small thickness along the surface of the sintered electrode layer 136, the formed first and second external electrodes 103, 105 have the same shape as the sintered electrode layer 136.

In the above-described method for manufacturing an electronic component of the present embodiment, the electrically conductive paste 133 and electrically conductive green sheet 131 are attached to the chip element 101 so that the end surfaces 131A to 131D of the electrically conductive green sheet 131 overlap the ridge portions R113 to R116, R123 to R126 and are positioned along the longitudinal direction of the ridge portions R113 to R116, R123 to R126, as viewed from the direction perpendicular to the electrically conductive green sheet 131, and also so that the electrically conductive paste 133 is present over a region from the ridge portions R113 to R116, R123 to R126 to the end surfaces 131A to 131D and covers the ridge portions R113 to R116, R123 to R126. Then, the electrically conductive paste 133 and electrically conductive green sheet 131 are dried and sintered to form the first and second external electrodes 103, 105. Therefore, in the first and second external electrodes 103, 105, the thickness of the corner portions 103R, 105R covering the ridge portions R113 to R116, R123 to R126 of the chip element 101 is larger than that of the plane portions 103P, 105P covering the end surfaces 111, 112 of the chip element 101. Therefore, the adhesive strength between the first and second external electrodes 103, 105 and the chip element 101 is increased. As a result, the occurrence of solder leach can be inhibited.

Furthermore, since the electrically conductive green sheet 131 is attached to the end surfaces 111, 112, the first and second external electrodes 103, 105 formed on the end surfaces 111, 112 have plane portions 103P, 105P parallel to the end surfaces 111, 112. Therefore the curvature radius of the corner portions 103R, 105R of the first and second external electrodes 103, 105 decreases. As a result, the occurrence of a tombstone phenomenon in which the electronic component rises when reflow soldering is performed can be prevented.

In the method for manufacturing an electronic component of the present embodiment, in the step of application electrically conductive paste S13, the electrically conductive paste 133 is applied on the end surfaces 111, 112 of the chip element 101, and in the step of attaching electrically conductive sheet S14, the electrically conductive green sheet 131 is attached to the end surfaces 111, 112 of the chip element 101 via the electrically conductive paste 133, whereby the electrically conductive paste 133 applied to the end surfaces 111, 112 of the chip element 101 is pressed out into the region from the ridge portions R113 to R116, R123 to R126 of the chip element 101 to the end surfaces 131A to 131D of the electrically conductive green sheet 131. Therefore, the thickness of the corner portions 103R, 105R covering the ridge portions R113 to R116, R123 to R126 of the chip element 101 is larger than that of the plane portions 103P, 105P covering the end surfaces 111, 112 of the chip element 101 and the first and second external electrodes 103, 105 with flat plane portions 103P, 105P can be easily formed.

In the method for manufacturing an electronic component of the present embodiment, in the step of attaching electrically conductive sheet S14, the electrically conductive green sheet 131 is moved reciprocatingly with respect to the end surfaces 111, 112 in the direction parallel to the end surfaces 111, 112 in a state in which the electrically conductive green sheet is attached to the end surfaces 111, 112 of the chip element 101 via the electrically conductive paste 133. In this case, the electrically conducive paste 133 that was attached to the end surfaces 111, 112 can be easily pressed out between the electrically conductive green sheet 131 and the ridge portions R113 to R116, R123 to R126 of the chip element 101. Further, an air drain can be formed between the end surfaces 111, 112 of the chip element 101, electrically conductive paste 133, and electrically conductive green sheet 131. As a result, the electrically conductive green sheet 131 can be strongly adhered to the end surfaces 111, 112 of the chip element 101 via the electrically conductive paste 133 by the surface tension of the electrically conductive paste 133.

In particular, in the step of attaching electrically conductive sheet S14, the electrically conductive green sheet 131 is moved reciprocatingly in the direction parallel to the end surfaces 111, 112 and in the diagonal direction of the end surfaces 111, 112 in a state in which the electrically conductive green sheet is attached to the end surfaces 111, 112 of the chip element 101 via the electrically conductive paste 133. As a result the electrically conductive paste 133 attached to the end surfaces 111, 112 can be even more easily pressed out into the space between the electrically conductive green sheet 131 and ridge portions R113 to R116, R123 to R126. Furthermore, the electrically conductive paste 133 can be pressed out with good efficiency to the four corners of the end surfaces 111, 112.

In the method for manufacturing an electronic component of the present embodiment, the electrically conductive green sheet 131 is used. In this case, the electrically conductive green sheet 131 is drier than the electrically conductive paste 133. Therefore, the solvent diffuses from the electrically conductive paste 133 into the electrically conductive green sheet 131 due a capillary phenomenon or the like. As a result, the electrically conductive paste 133 and electrically conductive green sheet 131 are integrated and dried. The integrated electrically conductive paste 133 and electrically conductive green sheet 131 are then sintered. As a result, the occurrence of cracks between a portion constituted by the electrically conductive past and a portion constituted by the electrically conductive sheet in the first and second external electrodes 103, 105 can be inhibited.

In the method for manufacturing an electronic component of the present embodiment, the electrically conductive paste 133 includes a glass component, and the electrically conductive green sheet 131 does not include a glass component. The glass component is included in the chip element 101. Therefore, the electrically conductive paste can be strongly bonded to the chip element 101. Further, because the electrically conductive green sheet 131 that is attached to the outer side of the electrically conductive paste 133 includes no glass component when sintering is performed, the adhesion of the electrode layers 134, 135 of a plurality of chip elements 101 to tie peripheral components can be inhibited. Furthermore, because the electrically conductive green sheet 131 includes no glass component the content ratio of the electrically conductive material can be increased accordingly and electric conductivity of the first and second external electrodes 103, 105 can be increased. Furthermore, when plating is performed on the sintered electrode layers 136, 137, because the electrically conductive green sheet 131 includes no glass component, adhesion between the plated film and the sintered electrode layers 136, 137 can be increased and peeling between the sintered electrode layers 136, 137 and the plated layer can be inhibited.

In the method for manufacturing an electronic component of the present embodiment, barrel polishing that forms the shape is performed and the sintered electrode layer 136 is formed after the electrically conductive layer 134 has been sintered. Therefore, mounting defects caused by shape defects of the first and second external electrodes 103, 105 can be inhibited.

The present invention is not limited to the above-described embodiment and can be modified in a variety of ways.

In the present embodiment, the electrically conductive green sheet 131 is attached to the chip element 101 after the electrically conductive paste 133 has been coated on the end surfaces 111, 112 of the chip element 101, but this feature is not limiting. Thus, the electrically conductive paste 133 may be applied so as to be present within a region from the ridge portions R113 to R116, R123 to R126 of the chip element 101 to the end surfaces 131A to 131D of the electrically conductive green sheet 131 after the electrically conductive green sheet 131 has been attached to the end surfaces 111, 112 of the chip element 101.

Further, for example in the present embodiment the electronic component C100 is a capacitor, but it may also be a varistor. In this case, the chip element 101 has a varistor layer instead of the above-described dielectric layer 107. The varistor layer contains ZnO as the main component and also contains single metal elements such as rare earth metal elements, Co, elements of Group IIIb (B, Al, Ga, In), Si, Cr, Mo, alkali metal elements (K, Rb, Cs), and alkaline earth metal elements (Mg, Ca, Sr, Ba) and oxides thereof. A chip element in which the varistor layer and internal electrode layer are laminated demonstrates a voltage nonlinear characteristic. Moreover, in the present embodiment, the electrically conductive green sheet 131 is used, but an electrically conductive metal sheet may be used instead thereof.

What is claimed is:

1. A method for manufacturing an electronic component provided with a chip element and external electrodes formed on the chip element, comprising:
   a preparation step of preparing the chip element having a flat first surface, a second surface perpendicular to the first surface, and a ridge portion between the first surface and the second surface;
   an application step of applying an electrically conductive paste and a sheet comprising an electrically conductive material to the chip element;
   a drying step of drying the electrically conductive paste and the sheet to form a layer comprising the electrically conductive material; and
   a formation step of sintering the layer and forming the external electrodes,
   wherein in the application step, the electrically conductive paste and the sheet are applied to the chip element so that the sheet overlaps at least portion of the ridge portion as viewed from a direction perpendicular to the sheet and is positioned opposite the first surface and the ridge portion at a distance from at least the ridge portion, and that the electrically conductive paste is present at least in a space sandwiched by the sheet and the ridge portion so as to cover the ridge portion, and
   wherein the sheet is an electrically conductive green sheet comprising an electrically conductive powder and a solvent.

2. The method for manufacturing an electronic component according to claim 1,
   wherein the application step comprises:
   a first application step of applying the electrically conductive paste to the first surface of the chip element; and
   a second application step of pressing out the electrically conductive paste applied to the first surface into the space sandwiched by the sheet and the ridge portion by attaching the sheet to the first surface via the electrically conductive paste.

3. The method for manufacturing an electronic component according to claim 2, wherein in the second application step, the sheet is moved reciprocatingly with respect to the first surface in a direction parallel to the first surface in a state in which the sheet is attached to the first surface via the electrically conductive paste.

4. The method for manufacturing an electronic component according to claim 2, wherein in the preparation step, the chip element having the first surface of a substantially rectangular shape is prepared; and in the second application step, the sheet is moved reciprocatingly with respect to the first surface in a direction parallel to the first surface and along a diagonal direction of the first surface in a state in which the sheet is attached to the first surface via the electrically conductive paste.

5. The method for manufacturing an electronic component according to claim 1, wherein in the preparation step, the chip element in the form of a substantially rectangular parallelepiped is prepared that has four second surfaces perpendicular to the first surface and four ridge portions between the first surface and the four second surfaces; and in the application step, the electrically conductive paste and the sheet are applied so that the electrically conductive paste is present at least in a space sandwiched by the sheet and the four ridge portions of the chip element.

6. The method for manufacturing an electronic component according to claim 1, wherein the electrically conductive paste comprises a glass component, and the sheet comprises no glass component.

7. The method for manufacturing an electronic component according to claim 1, wherein in the formation step, barrel polishing is performed after the layer has been sintered.

8. A method for manufacturing an electronic component provided with a chip element and external electrodes formed on the chip element, comprising:

a preparation step of preparing the chip element having a flat first surface, a second surface perpendicular to the first surface, and a ridge portion between the first surface and the second surface;

an application step of applying an electrically conductive paste and a sheet comprising an electrically conductive material to the chip element;

a drying step of drying the electrically conductive paste and the sheet to form a layer comprising the electrically conductive material; and a formation step of sintering the layer and forming the external electrodes, wherein in the application step, the electrically conductive paste and the sheet are applied to the chip element so that an end surface of the sheet overlaps the ridge portion along a longitudinal direction of the ridge portion, as viewed from a direction perpendicular to the sheet, and that the electrically conductive paste is present over a region from the ridge portion to the end surface so as to cover the ridge portion, and wherein the sheet is an electrically conductive green sheet comprising an electrically conductive powder and a solvent.

9. The method for manufacturing an electronic component according to claim 8, wherein the application step comprises:

a first application step of applying the electrically conductive paste to the first surface of the chip element; and a second application step of pressing out the electrically conductive paste applied to the first surface into a region from the ridge portion to the end surface by attaching the sheet to the first surface via the electrically conductive paste.

10. The method for manufacturing an electronic component according to claim 9, wherein in the second application step, the sheet is moved reciprocatingly with respect to the first surface in a direction parallel to the first surface in a state in which the sheet is attached to the first surface via the electrically conductive paste.

11. The method for manufacturing an electronic component according to claim 9, wherein in the preparation step, the chip element having the first surface of a substantially rectangular shape is prepared; and in the second application step, the sheet is moved reciprocatingly with respect to the first surface in a direction parallel to the first surface and along a diagonal direction of the first surface in a state in which the sheet is attached to the first surface via the electrically conductive paste.

12. The method for manufacturing an electronic component according to claim 8, wherein in the preparation step, the chip element in the form of a substantially rectangular parallelepiped is prepared that has four second surfaces perpendicular to the first surface and four ridge portions between the first surface and the four second surfaces; and in the application step, the electrically conductive paste and the sheet are attached to the chip element so that the four end surfaces of the sheet of a substantially rectangular shape overlap the respective ridge portions along a longitudinal direction of the ridge portions, as viewed from the direction perpendicular to the sheet, and that the electrically conductive paste is present over a region from the ridge portions to the end surfaces so as to cover the ridge portions.

13. The method for manufacturing an electronic component according to claim 8, wherein the electrically conductive paste comprises a glass component and the sheet comprises no glass component.

14. The method for manufacturing an electronic component according to claim 8, wherein in the formation step, barrel polishing is performed after the layer has been sintered.

* * * * *